(12) United States Patent
Suo et al.

(10) Patent No.: US 8,457,032 B2
(45) Date of Patent: Jun. 4, 2013

(54) METHOD AND APPARATUS FOR DATA TRANSMISSION IN A TIME DIVISION DUPLEXING SYSTEM

(75) Inventors: Shiqiang Suo, Beijing (CN); Guojun Xiao, Beijing (CN); Xueming Pan, Beijing (CN); Shaohui Sun, Beijing (CN); Yingmin Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 455 days.

(21) Appl. No.: 12/741,020

(22) PCT Filed: Oct. 31, 2008

(86) PCT No.: PCT/CN2008/072907
§ 371 (c)(1),
(2), (4) Date: Apr. 30, 2010

(87) PCT Pub. No.: WO2009/059555
PCT Pub. Date: May 14, 2009

(65) Prior Publication Data
US 2010/0238847 A1    Sep. 23, 2010

(30) Foreign Application Priority Data

Nov. 2, 2007  (CN) .......................... 2007 1 0176798
Nov. 9, 2007  (CN) .......................... 2007 1 0177115

(51) Int. Cl.
*H04W 4/00* (2009.01)
(52) U.S. Cl.
USPC .......................................................... 370/314

(58) Field of Classification Search
USPC .................................................. 370/310–463
See application file for complete search history.

(56) References Cited

U.S. PATENT DOCUMENTS 7,577,216 B2 *  8/2009  Zhang ............................ 375/343
7,916,710 B2 *  3/2011  Che et al. ....................... 370/345

(Continued)

FOREIGN PATENT DOCUMENTS

CN       1592147 A      3/2005
CN       1913418 A      2/2007

(Continued)

OTHER PUBLICATIONS

Chinese Office Action for Chinese Patent Application No. 200710176798.5, dated Oct. 27, 2011, and English translation thereof.

(Continued)

*Primary Examiner* — Jeffrey M Rutkowski
*Assistant Examiner* — Juvena Loo

(57) ABSTRACT

A method for data transmission in a TDD system is disclosed. The method includes: configuring, by a base station, a length respectively for a Downlink Pilot Slot (DwPTS) and an Uplink Pilot Slot (UpPTS) within a special field of a radio half-frame based on a current coverage area taking one Orthogonal Frequency Division Multiplexing (OFDM) symbol as a unit, and issuing a configured result to a user device, wherein a total length of the DwPTS, a Guard Period (GP) slot and the UpPTS is kept to be 1 ms; constructing, by the base station, radio half-frames for data transmission according to the configured result. An apparatus for data transmission in the TDD system is also disclosed. According to the present invention, coverage area of different levels with smaller granularity is supported, radio resources are saved and transmission efficiency is increased.

20 Claims, 11 Drawing Sheets

U.S. PATENT DOCUMENTS

| | | | |
|---|---|---|---|
| 2003/0076812 A1* | 4/2003 | Benedittis | 370/350 |
| 2003/0086381 A1* | 5/2003 | Terry et al. | 370/280 |
| 2004/0005887 A1* | 1/2004 | Bahrenburg et al. | 455/422.1 |
| 2006/0087997 A1* | 4/2006 | Li | 370/320 |
| 2009/0125363 A1* | 5/2009 | Frederiksen et al. | 705/8 |

FOREIGN PATENT DOCUMENTS

| | | |
|---|---|---|
| CN | 1917420 A | 2/2007 |
| CN | 101005305 A | 7/2007 |

OTHER PUBLICATIONS

Chinese Office Action for Chinese Patent Application No. 200710177115.8, dated Nov. 30, 2011, and English translation thereof.

Korean Office Action for Korean Patent Application No. 10-2010-7012253, dated Jun. 27, 2011, and English translation thereof.

* cited by examiner

| | | |
|---|---|---|
| GP=1 | | All, compatible |
| | | 1:6, 4:3, compatible |
| GP=2 | | 3:4, 6:1, compatible |
| | | 2:5, compatible |
| | | 5:2, compatible |
| | | 1:6, 4:3, compatible |
| GP=3 | | 3:4, 6:1, not compatible |
| | | 2:5,5:2, compatible |
| GP=4 | | 1:6, 4:3, compatible |
| | | 2:5,5:2, compatible<br>3:4, 6:1, not compatible |
| GP=5 | | 1:6, 4:3, compatible |
| | | 3:4, 6:1, not compatible<br>2:5,5:2, compatible |
| GP=11 | | All, compatible |
| GP=13 | | All, compatible |

■ Field 1
☐ Field 2
▪ Field 3

FIG.12

METHOD AND APPARATUS FOR DATA TRANSMISSION IN A TIME DIVISION DUPLEXING SYSTEM

CROSS-REFERENCE TO RELATED APPLICATIONS

This application is a U.S. National Stage Application of International application No. PCT/CN2008/072907, filed Oct. 31, 2008. This application claims the benefit of Chinese Patent Application No. 200710176798.5, filed Nov. 2, 2007 and Chinese Patent Application No. 200710177115.8, filed Nov. 9, 2007. The disclosures of the above applications are incorporated herein by reference.

FIELD OF THE INVENTION

The present invention relates to long-term evolution of Time Division Duplexing (TDD) system, and more particularly, to method and apparatus for data transmission in a TDD system.

BACKGROUND OF THE INVENTION

The 3rd Generation (3G) mobile communication systems adopt Code Division Multiple Access (CDMA) techniques and support multimedia services, thus have strong competitiveness. To maintain the competitiveness for long time, 3GPP has launched a Long Term Evolution (LTE) research program for 3G wireless interface techniques.

At present, the LTE system supports 2 types of frame structures. Among three international 3G standards, TD-SCDMA is the only one that adopts TDD manner. In the long-term evolution of the TD-SCDMA (LTE TDD), a preferred frame structure is the frame structure type 2 which is compatible with the TD-SCDMA system, as shown in FIG. 1. Each radio frame has a frame length of 10 ms and consists of two half-frames of length 5 ms each. Each half-frame consists of 7 service slots (denoted as 0-6) and 3 special slots, i.e. a Downlink Pilot Slot (DwPTS), a Guard Period (GP) and an Uplink Pilot Slot (UpPTS). A service slot is defined as a subframe. The subframe 0 and the DwPTS are always reserved for downlink transmission while the UpPTS and the subframe 1 are always reserved for uplink transmission.

The LTE TDD system is based on Orthogonal Frequency Division Multiplexing (OFDM) technique. Subcarrier spacing is 15 kHz, and correspondingly, the length of an OFDM symbol is 66.67 us. A Cyclic Prefix (CP) is added at the head of each OFDM symbol for the purpose of OFDM symbol timing during de-modulation. For unicast services and applications with restricted coverage area, normal CP with a length of 4.76 us is adopted. Thus, the length of the whole OFDM symbol will be 66.67 us+4.76 us≈71.4 us. While for multi-cell broadcast services and applications with large coverage areas, extended CP with a length of 16.66 us is adopted, in which case the length of the whole OFDM symbol will be 66.67 us+16.66 us≈88.3 us.

In TDD systems, guard periods are necessary at downlink-to-uplink switch-points to avoid interference between downlink slots and uplink slots. Therefore, as described in the above, guard periods are adopted as special slots in the structure of the radio frame in current LTE TDD systems. The length of the GP slot equals to the time taken by electromagnetic wave for traveling twice the radius of a cell, i.e., $T_{GP}=2*R_{cell}/C$, where $R_{cell}$ denotes the radius of a cell, C denotes the velocity of light ($3*10^8$ m/s).

In the frame structure shown in FIG. 1, the length of the GP slot is 75 us, under which the maximum coverage area is (75 us/2)×3×$10^8$ m/s=11.25 km. The current length of the GP slot may be modified to support different coverage areas. The GP slot may be designed in the following manner: vacate one or more consecutive uplink slots for forming a larger GP slot between a downlink slot and its subsequent uplink slot to support a larger coverage area. Specifically, three lengths for the GP slot are currently provided for a base station to choose from based on the area of the cell covered by the base station.

1. For a small size coverage area where the radius of the cell is smaller than 7.5 km, the frame structure with respect to restricted coverage area shown in FIG. 2 may be adopted. At this time, the length of the GP slot is 50 us and random access may be performed within the UpPTS.

2. For a medium size coverage area where the radius of the cell is larger than 7.5 km but smaller than 30 km, the length of the GP slot according to the TDD frame structure type 2 is not long enough. The GP slot and the UpPTS may be combined to form a new GP slot which has a length of 191.66 us and can support a coverage area about 29 km. In this situation, random access may be performed within TS1 or any subsequent uplink slot. The frame structure which supports the medium size coverage area according to the TDD frame structure type 2 is shown in FIG. 3.

3. For a large size coverage area where the radius of the cell is larger than 30 km, whole TS1 in the TDD frame structure type 2 is reserved and combined with the GP slot and the UpPTS to form a new GP slot with a length of 866.66 us which is long enough to support a coverage area over 100 km. In this situation, random access is performed within TS2 and its subsequent uplink slots. The frame structure which supports the large size coverage area according to the TDD frame structure type 2 is shown in FIG. 4.

The base station and the user device respectively store frame structures corresponding to the above three lengths of the GP slot. The base station may select one of them based on the coverage area of the base station and inform the user device of the length selected. During subsequent data transmission between the base station and the user device, the frame structure corresponding to the selected length of the GP slot is adopted for carrying data.

According to the above, the granularity for adjusting the length of the GP slot equals to the length of one uplink slot. Therefore, the difference between coverage areas of different levels is relatively large. When employed for data transmission, the above method cannot support different coverage areas flexibly, which leads to a waste of radio resources and low transmission efficiency. For example, to cover a cell whose radius is 50 km, the third kind of length for the GP slot and the corresponding frame structure will be adopted for data transmission. But in fact, a large part of the slot is wasted acting as guard period, which also affects the transmission efficiency.

SUMMARY OF THE INVENTION

In view of the above, embodiments of the present invention provide a method and an apparatus for data transmission in a TDD system which support different levels of coverage areas with smaller granularity, so as to save radio resources and improve transmission efficiency.

According to an embodiment of the present invention, a method for data transmission in the TDD system is provided. The method includes:

configuring, by a base station, a length respectively for a Downlink Pilot Slot (DwPTS) and an Uplink Pilot Slot (UpPTS) within a special field of a radio half-frame based on a current coverage area taking one Orthogonal Frequency Division Multiplexing (OFDM) symbol as a unit, and issuing a configured result to a user device; wherein a total length of the DwPTS, a Guard Period (GP) slot and the UpPTS is kept to be 1 ms;

constructing, by the base station, radio half-frames for data transmission according to the configured result.

According to another embodiment of the present invention, an apparatus for data transmission in a TDD system is provided. The apparatus includes:

means for respectively setting, within a special field of a radio half-frame and according to a coverage area, a length for a Downlink Pilot Slot (DwPTS) and an Uplink Pilot Slot (UpPTS) taking one Orthogonal Frequency Division Multiplexing (OFDM) symbol as a unit, issuing a configured result to the user device; and constructing radio half-frames for data transmission according to the configured result, wherein a total length of the DwPTS, a Guard Period (GP) slot and the UpPTS is kept to be 1 ms.

According to still another embodiment of the present invention, an apparatus for data transmission in a TDD system is provided. The apparatus includes:

means for configuring a set of configurations for a special field with respect to a situation where it is required to be compatible with a TD-SCDMA system and configure a set of configurations for the special field with respect to a situation where it is not required to be compatible with the TD-SCDMA system, wherein each configuration comprises lengths of a Guard Period (GP) slot, a Downlink Pilot Slot (DwPTS) and an Uplink Pilot Slot (UpPTS) which are configured taking one Orthogonal Frequency Division Multiplexing (OFDM) symbol as a unit, and a total length of the DwPTS, the GP slot and the UpPTS is kept to be 1 ms; means for determining one set of configurations according to a current situation that whether it is required to be compatible with the TD-SCDMA system; means for selecting a configuration from the set of configurations determined according to a coverage area and system performance, and means for issuing the configuration selected to a user device; and construct radio half-frames for performing data transmission according to the selected configuration.

It can be seen from the above that, according to the present invention, the base station configures the lengths for the DwPTS and the UpPTS within the special field of the radio half-frame taking each OFDM symbol as a unit, and issues a configured result to the user device. The user device and the base station perform data transmission utilizing radio half-frames constructed according to the lengths of the DwPTS and the UpPTS. By adopting the method of the present invention, since the length of the GP slot is configured by taking each OFDM symbol as a unit and the length of an OFDM symbol is much shorter than that of a regular slot in the frame structure as shown in FIG. 1, the granularity for adjusting the length of the GP slot is decreased. Therefore, coverage areas of different levels may be supported, radio resources may be saved and transmission efficiency may be improved.

BRIEF DESCRIPTION OF THE DRAWINGS

FIG. 12 is a schematic diagram illustrating a configuration of lengths for the GP slot, the DwPTS and the UpPTS when normal CP is adopted under different coverage area and compatibility requirements in accordance with the second embodiment of the present invention.

DETAILED DESCRIPTION OF THE INVENTION

The basic idea of the present invention lies in that: reduce the granularity for adjusting the length of a GP slot to provide coverage areas of different levels more flexibly.

Figure 1:
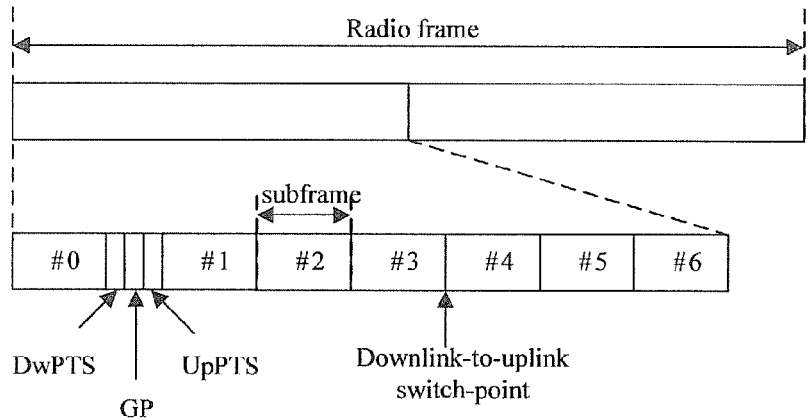
FIG. 1 is a schematic diagram illustrating a frame structure in an LTE TDD system according to the prior art.
Figure 5:
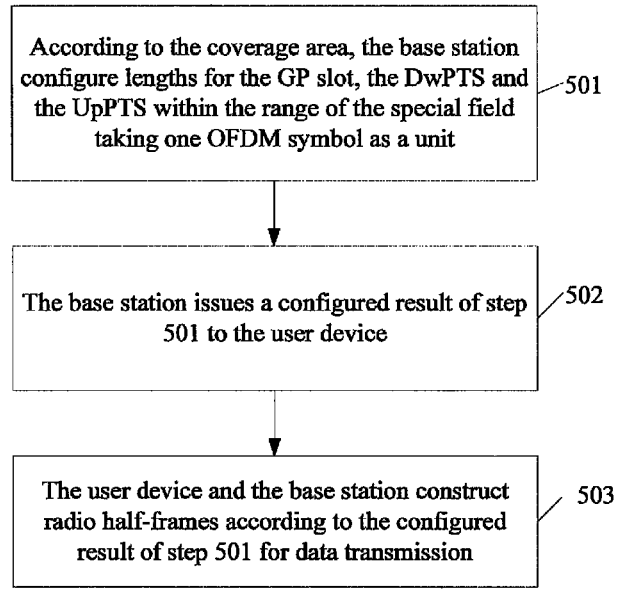
FIG. 5 is a flowchart illustrating a method for data transmission in a TDD system in accordance with the present invention.

FIG. 5 is a flowchart illustrating a method for data transmission in a TDD system in accordance with the present invention. As shown in FIG. 1, the method includes steps as follows.

Step 501, a base station configures, based on a coverage area, a length for a GP slot within the length occupied by a special field of a radio half-frame taking each OFDM symbol as a unit, and configures a length for a DwPTS and an UpPTS respectively.

The special field mentioned in the present invention refers to a field consists of three special slots in a 5 ms radio half-frame of the frame structure type 2. In the present invention, the length of the GP slot in the special field may be adjusted with the granularity of an OFDM symbol. Specifically, a GP length required for switching from downlink to uplink may be calculated based on a coverage area according to the formula of $T_{GP}=2*R_{cell}/C$. configure the GP slot to occupy N OFDM symbols, wherein the GP length calculated is shorter than N OFDM symbols but longer than N−1 OFDM symbols. On the one hand, the GP length shorter than N OFDM symbols ensures that the GP slot may support the required coverage area. On the other hand, the GP length longer than N−1 OFDM symbols ensures that more time and frequency resources may be saved for transmitting other information.

The OFDM symbol is taken as a unit for configuring the length for the GP slot because a coding/modulating scheme adopted by the LTE TDD system is OFDM modulation or extended OFDM modulation, and both of them have the same symbol length, i.e. one OFDM symbol. Therefore, the OFDM symbol is taken as a unit for resource allocation. In the following, the length of time occupied by an OFDM symbol is also referred to as a symbol.

Step 502, the base station issues a configured result of step 501 to the user device.

Step 503, the user device and the base station perform data transmission utilizing radio half-frames constructed according to the configured result of step 501.

Now, the process of the method for data transmission provided by the present invention is finished.

Figure 6:
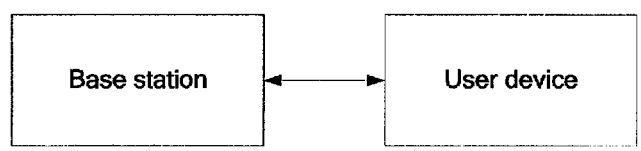
FIG. 6 is a block diagram illustrating an overall structure of a TDD system in accordance with the present invention.

FIG. 6 is a block diagram illustrating an overall structure of a TDD system in accordance with the present invention. As shown in FIG. 6, the system includes: a base station and a user device.

In the system, the base station is adapted to configure a length for a GP slot within the length of a special field of a radio half-frame taking the length of each OFDM symbol as a unit, configure a length for a DwPTS and an UpPTS respectively based on the length of the GP slot, issue a configured result to the user device, and construct radio half-frames for data transmission according to the configured result.

The user device is adapted to receive the configured result from the base station, and perform data transmission with the base station utilizing radio half-frames constructed according to the configured result.

Preferably, the base station may include:

a relationship storing unit, adapted to establish a relationship between each coverage area and compatibility requirement with a TD-SCDMA system and corresponding lengths of the GP slot, the DwPTS and the UpPTS, and store all relationships;

a selecting unit, adapted to select a combination of the lengths of the GP slot, the DwPTS and the UpPTS corresponding to a current coverage area and compatibility requirement from the relationships stored in the relationship storing unit.

The above is an overview of the present invention. It can be seen that, a smaller granularity is adopted for configuring the length of the GP slot in the method of the present invention. Thus, coverage areas of different levels may be supported more flexibly and transmission efficiency may be improved. Since adjustment of the length of the GP slot is within the special field, the adjustment is restricted by the length of the special field, i.e., the maximum coverage area supported by the radio half-frame is restricted by the length of the special field. Preferably, the special field according to the frame structure shown in FIG. 1 may be prolonged to extend the range for adjusting the length of the GP slot. As such, the maximum coverage area supported may be increased. Since the length of the radio half-frame is fixed, the change in length of the special field will influence the length of regular slots in the radio half-frame. Embodiment of the present invention will be described hereinafter in detail taking a new radio frame structure as an example.

Figure 7:
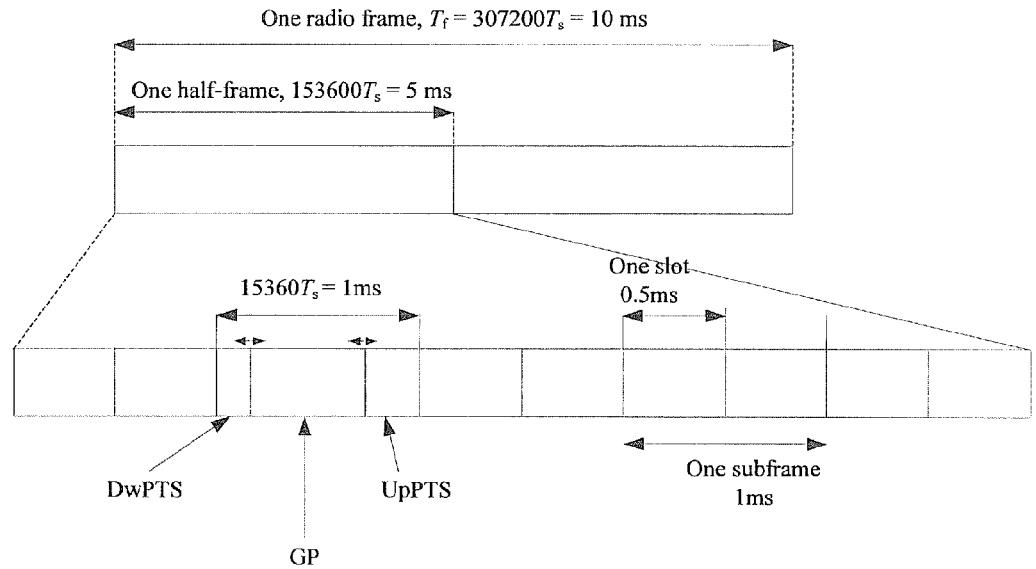
FIG. 7 is a schematic diagram illustrating a frame structure in an LTE TDD system in accordance with an embodiment of the present invention.

FIG. 7 shows a structure of a new radio frame in accordance with an embodiment of the present invention. According to the structure, each 5 ms half-frame is divided into 8 0.5 ms regular slots and one 1 ms special field. The special field consists of a DwPTS, a GP slot and an UpPTS. Two regular slots form a subframe. Embodiments of the present invention will be described based on the above radio frame structure.

A First Embodiment

Figure 8:
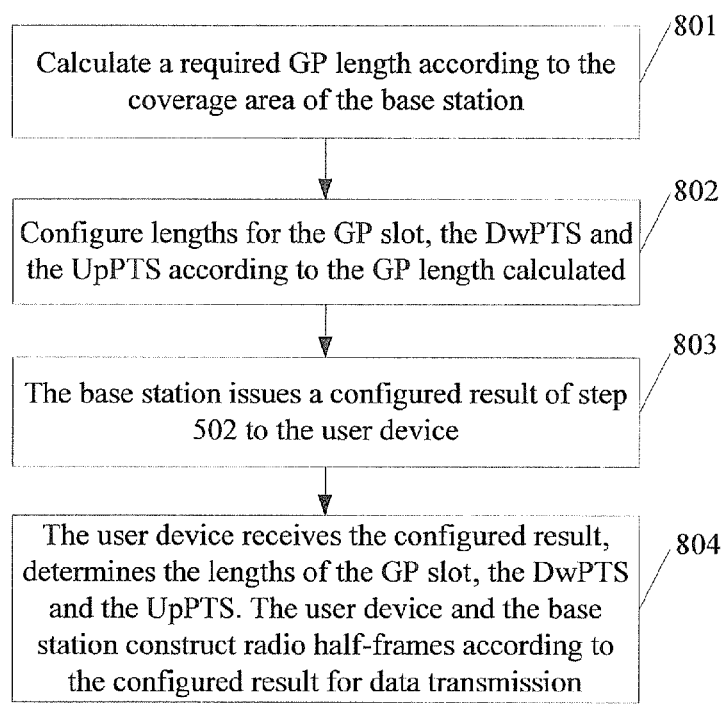
FIG. 8 is a flowchart illustrating a detailed process for data transmission in the TDD system in accordance with a first embodiment of the present invention.

FIG. 8 is a flowchart illustrating a detailed process for data transmission in the TDD system in accordance with the first embodiment of the present invention. As shown in FIG. 8, the method includes the following steps.

Step 801, calculate a GP length based on a coverage area of a base station.

In this step, the calculation of the GP length follows: $T_{GP}=2*R_{cell}/C$.

Step 802, configure lengths for the GP slot, the DwPTS and the UpPTS based on the GP length calculated.

As mentioned above, the length of time occupied by an OFDM symbol is taken as a unit for allocating length for the GP slot. The allocated length for the GP slot is larger than or equal to the GP length calculated in step 801. When the coverage area alone is considered for configuring the lengths for the GP slot, the DwPTS and the UpPTS, it should be guaranteed that the length of the GP slot is configured to be as small as possible. Since P-SCH is implemented in the DwPTS and occupies 1 symbol (S), the DwPTS should occupy at least one symbol. And since PRACH is implemented in the UpPTS and occupies 2 S, the UpPTS should occupy at least two symbols. In addition, the total length of the GP slot, the DwPTS and the UpPTS, i.e. the length of time occupied by the special field, is 1 ms. The lengths of the GP slot, the DwPTS and the UpPTS may be configured randomly if only the above requirements are satisfied. In another implementation manner of the present invention, the following restriction may also be adopted for configuring lengths for the slots in the special field: the DwPTS occupies at least two symbols.

In practical applications, a TD-SCDMA system may exist within the coverage area of a base station of the LTE TDD system. Thus, system compatibility of the two systems should be taken into consideration when configuring lengths for the GP slot, the DwPTS and the UpPTS, so as to ensure signal qualities for both the two networks. The compatibility refers that uplink/downlink relationships of the two systems should keep consistent in a co-existing area of the two systems, i.e., the two system should have their uplink/downlink switchpoints aligned to each other, so as to guarantee that the two systems do not interfere with each other. Since the LTE TDD system is an evolution based on the TD-SCDMA system, the TD-SCDMA system usually exists in an area before the LTE TDD system is developed in the same area. Thus, it is preferable to have the radio frame of the LTE TDD system designed consistent with that of the TD-SCDMA system.

Therefore, if compatibility is taken into consideration, the following process should be performed when configuring the slots in this step.

Step 802*a*, determine whether it is required to be compatible with the TD-SCDMA system, if it is required to be compatible with the TD-SCDMA system, proceed to step 802*b*; otherwise, proceed to step 802*c*.

When configuring lengths for the GP slot, the DwPTS and the UpPTS of a radio half-frame in the LTE TDD system, if the TD-SCDMA system exists in the coverage area of the base station, compatibility usually has to be considered and the lengths of the GP slot, the DwPTS and the UpPTS may be configured according to step 802*b*. If no TD-SCDMA system exists in the coverage area of the base station, compatibility may be not considered, and the lengths of the slots in the special field may be configured according to step 802*c*.

Step 802*b*, configure lengths for the GP slot, the DwPTS and the UpPTS according to the GP length calculated in step 801, an downlink-uplink slot ratio of the TD-SCDMA system and the structure of the regular slots.

Figure 2:
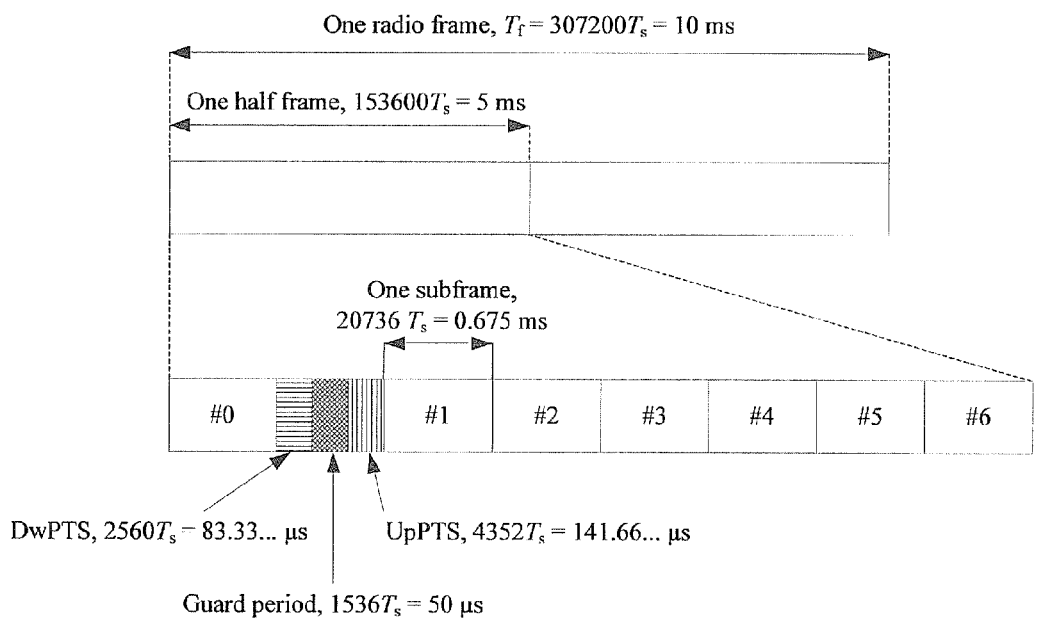
FIG. 2 is a schematic diagram illustrating a frame structure for a small size coverage area in the LTE TDD system according to the prior art.
Figure 3:
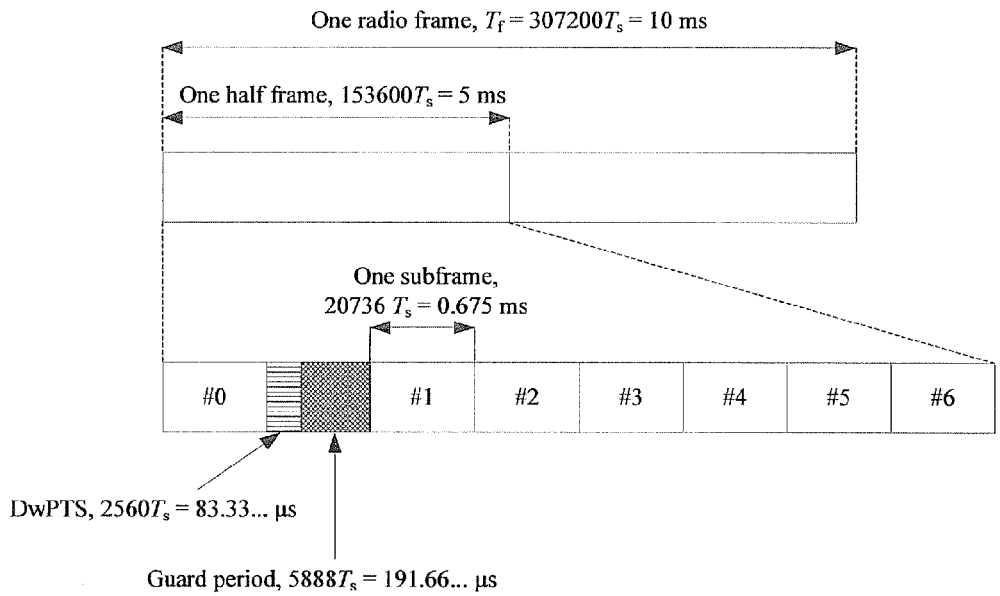
FIG. 3 is a schematic diagram illustrating a frame structure for medium size coverage area in the LTE TDD system according to the prior art.
Figure 4:
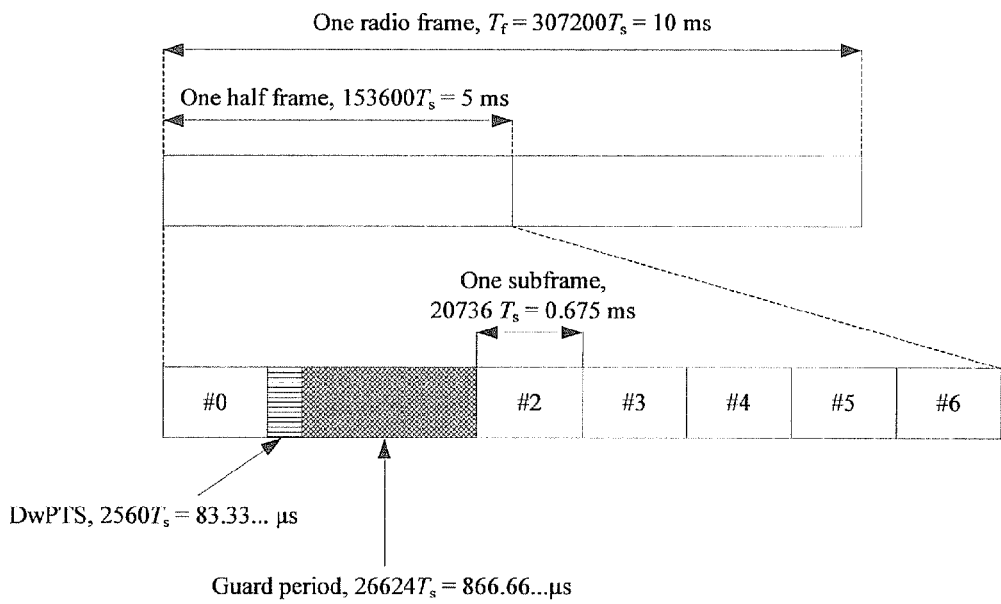
FIG. 4 is a schematic diagram illustrating a frame structure for large size coverage area in the LTE TDD system according to the prior art.

Specifically, the radio frame structure of the TD-SCDMA system is the same as the frame structure shown in FIG. 2. There are six downlink-uplink slot ratios and corresponding positions of the downlink-to-uplink switch-points. The length of the GP slot in the TD-SCDMA system is 75 us, and there are two requirements for achieving compatibility. First, the length of the GP slot in the LTE TDD system should not be shorter than 75 us; taking one OFDM symbol as a unit, the length of the GP slot in the LTE TDD system should be at least two OFDM symbols when normal CP is adopted and at least one OFDM symbol when extended CP is adopted. Second, the downlink-uplink slot ratio should be consistent with that in the TD-SCDMA system, thus the configuration of the lengths for the GP slot, the DwPTS and the UpPTS should take the structure of the regular slots into consideration. Specifically, the structure includes the length of the regular slots and a relationship between the locations of the regular slots and the special field, etc.

The above structure of the regular slots is shown in FIG. 7. Two adjacent regular slots form a subframe and are reserved to be either both uplink slots or both downlink slots during resource allocation. According to the above compatibility requirement, i.e., the requirement of keeping the downlink-to-uplink switch-points aligned and the GP slot of the LTE TDD system should cover the GP slot of the TD-SCDMA system, the lengths of the GP slot, the DwPTS and the UpPTS may be calculated according to different coverage area requirements. The following description will take a minimum coverage area requirement as an example.

Figure 9:
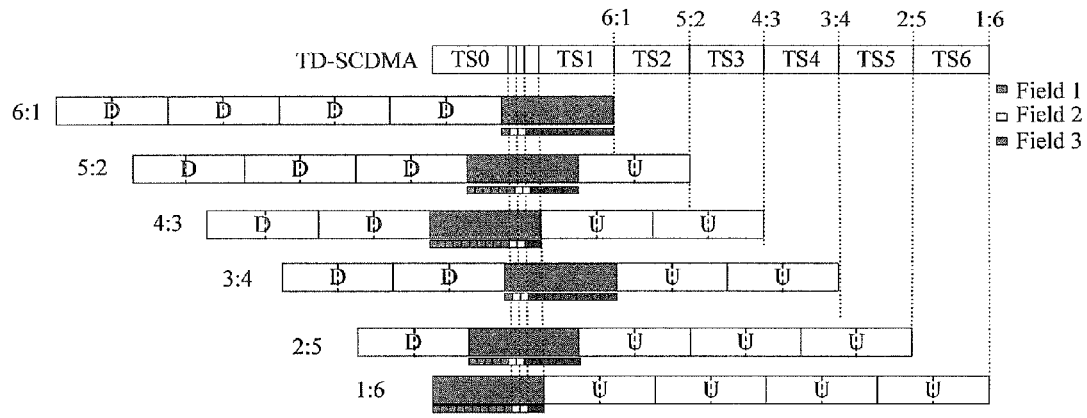
FIG. 9 is a schematic diagram illustrating a configuration of lengths for the GP slot, the DwPTS and the UpPTS when normal CP is adopted under a minimum coverage area requirement in accordance with the first embodiment of the present invention.

According to the compatibility requirement, when and normal CP is adopted, the lengths for the GP slot, the DwPTS and the UpPTS under the minimum coverage area requirement may be configured as shown in FIG. 9.

In FIG. 9, the first line illustrates a frame structure of the TD-SCDMA system, wherein switch-points corresponding to different downlink-uplink slot ratios are marked. For example, 6:1 marked above the frame structure means that the downlink-uplink slot ratio is 6:1, and the downlink-to-uplink switch-point is at the vertical dotted line corresponding to 6:1. The second to the seventh line respectively represents different configurations of the radio half-frame of the LTE TDD system corresponding to different slot ratios of the TD-SCDMA system.

Specifically, in the second to the seventh line, subframes labeled with D are downlink subframes (one subframe consists of two regular slots), subframes labeled with U are uplink subframes, and the shading area represents the special field. When normal CP is adopted, the special field includes 14 symbols as illustrated below the special field. In the special field, field 1 denotes the DwPTS and may be seen as downlink slots, field 2 denotes the GP slot, and field 3 denotes the UpPTS may be seen as uplink slots. As shown in FIG. 9, when the downlink-uplink slot ratio of the TD-SCDMA system is 6:1, the LTE TDD system may adopt the slot configuration illustrated in the first line, i.e., the DwPTS occupies 1 OFDM symbol, the GP slot occupies 2 OFDM symbols, and the UpPTS occupies 11 OFDM symbols. Thus, the downlink-to-uplink switch point of the LTE TDD system (at the end of the special field) is consistent with that of the TD-SCDMA system. Meanwhile, the GP slot of the LTE TDD system covers that of the TD-SCDMA system. As shown in FIG. 9, configurations under other slot ratios also satisfy the above requirements and will not be described herein.

The configurations of the lengths for the GP slot, the DwPTS and the UpPTS in the radio half-frame of the LTE TDD system shown in FIG. 9 may also be shown as Table 1.

TABLE 1

| Slot ratio of the TD-SCDMA system (downlink:uplink) | DwPTS(S) | GP(S) | UpPTS(S) |
| --- | --- | --- | --- |
| 1:6 | 10 | 2 | 2 |
| 2:5 | 5 | 2 | 7 |
| 3:4 | 1 | 2 | 11 |
| 4:3 | 10 | 2 | 2 |
| 5:2 | 6 | 2 | 6 |
| 6:1 | 1 | 2 | 11 |

Figure 10:
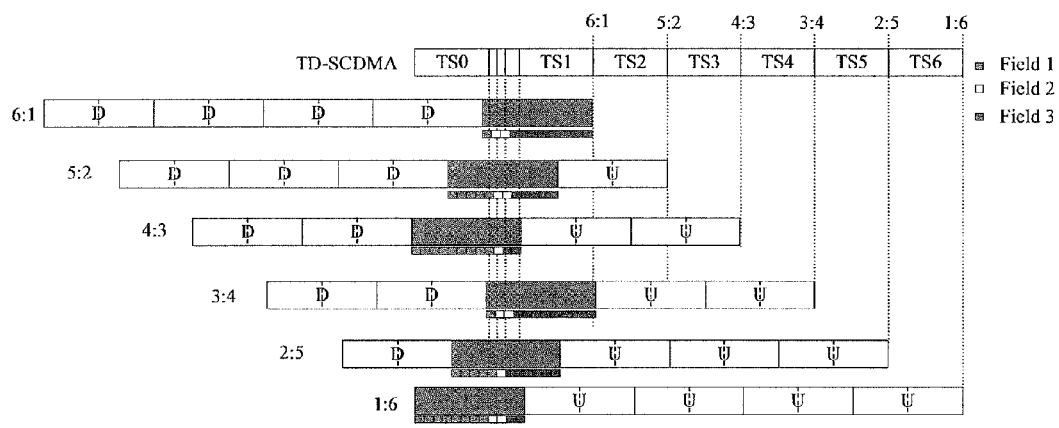
FIG. 10 is a schematic diagram illustrating a configuration of lengths for the GP slot, the DwPTS and the UpPTS when extended CP is adopted under the minimum coverage area requirement in accordance with the first embodiment of the present invention.

Likewise, according to the compatibility requirement, when extended CP is adopted, the lengths of the GP slot, the DwPTS and the UpPTS under the minimum coverage area requirement may be configured as shown in FIG. 10. The configurations shown in FIG. 10 may also be shown as Table 2.

TABLE 2

| Slot ratio of the TD-SCDMA system (downlink:uplink) | DwPTS(S) | GP(S) | UpPTS(S) |
| --- | --- | --- | --- |
| 1:6 | 8 | 2 | 2 |
| 2:5 | 5 | 1 | 6 |
| 3:4 | 1 | 2 | 9 |
| 4:3 | 9 | 1 | 2 |
| 5:2 | 5 | 2 | 5 |
| 6:1 | 1 | 2 | 9 |

As shown in FIG. 10, when it is required to be compatible with the slot ratio 4:3 of the TD-SCDMA system, the first symbol of the UpPTS in the radio half-frame of the LTE TDD system will enter the range of the GP slot of the TD-SCDMA system. In extreme situations, part of the symbol will be interfered by the DwPTS of the TD-SCDMA system. Fortunately, thanks to the CP structure of the OFDM, the interference will only influence the CP. Thus the interference may be neglected.

The configurations shown in the above FIG. 9, FIG. 10, Table 1 and Table 2 are obtained based on a minimum coverage area requirement. Based on the configurations under the minimum coverage area requirement, the length of the GP slot may be adjusted according to different coverage area requirements to obtain different slot configurations. Specifically, the length of the GP slot under the minimum coverage area configuration may be extended according to the coverage area requirement, i.e., puncture the symbols in the DwPTS or the UpPTS adjacent to the GP slot, or puncture the symbols in both the DwPTS and the UpPTS adjacent to the GP slot to extend the length of the GP slot.

For example, when normal CP is adopted, in order to extend the coverage area by one level, i.e., make the length of the GP slot be 3 OFDM symbols, there may be two configuration manners according to the third line in the configurations illustrated in FIG. 9 (i.e. it is required to be compatible with the situation of downlink-uplink slot ratio 5:2).

1. Take one OFDM symbol on the left of the GP slot as part of the GP slot to make the GP slot occupy 3 symbols. At this time, the DwPTS occupies 5 symbols and the UpPTS occupies 6 symbols.

2. Take one OFDM symbol on the right of the GP slot as part of the GP slot to make the GP slot occupy 3 symbols. At this time, the DwPTS occupies 6 symbols and the UpPTS occupies 5 symbols.

Many configurations for the special field may be obtained in the same manner. If the DwPTS is configured with a minimum length of 80.57 us and the UpPTS is configured with a minimum length of 141.66 us (suppose GT is 8.33 us), the length of the GP slot will be 777.8 us which support a maximum coverage area of about 116 km. For extraordinarily big coverage areas, the PRACH may be implemented in the uplink slot following the special field to further extend the GP slot.

Any configuration may be selected for configuring lengths for the slots according to the slot ratio of the TD-SCDMA system.

Step 802c, configure lengths for the GP slot, the DwPTS and the UpPTS based on the GP length calculated in step 801.

This manner is the above mentioned configuring manner which only takes the coverage area requirement into consideration and will not be described further.

Step 803, the base station issues the configured result of step 802 to the user device.

In this step, the base station may issue the configured result to the user device via upper layer signaling through, e.g. a broadcast channel.

Step 804, the user device receives the configured result, determines the lengths of the GP slot, the DwPTS and the UpPTS. The user device and the base station perform data transmission utilizing radio half-frames constructed according to the configured result.

Now, the process of the method in accordance with the first embodiment of the present invention is finished. In the first embodiment, the process of obtaining different configurations for the slots based on the compatibility and coverage area requirements in step 802 may also be implemented in advance. Then, store the configurations in the base station and the user device, and assign a serial number for each configuration. When requiring configuring lengths for the GP slot, the DwPTS and the UpPTS to be adopted by a local cell, the base station may select a serial number of a configuration which satisfies the current compatibility and coverage area requirement and informs the user device of the serial number. The user device determines the configuration selected by the base station according to the serial number received and the locally stored configurations. In this way, the user device and the base station may perform data transmission utilizing radio half-frames constructed according to this configuration. The above manner will be illustrated by a detailed embodiment.

A Second Embodiment

Figure 11:
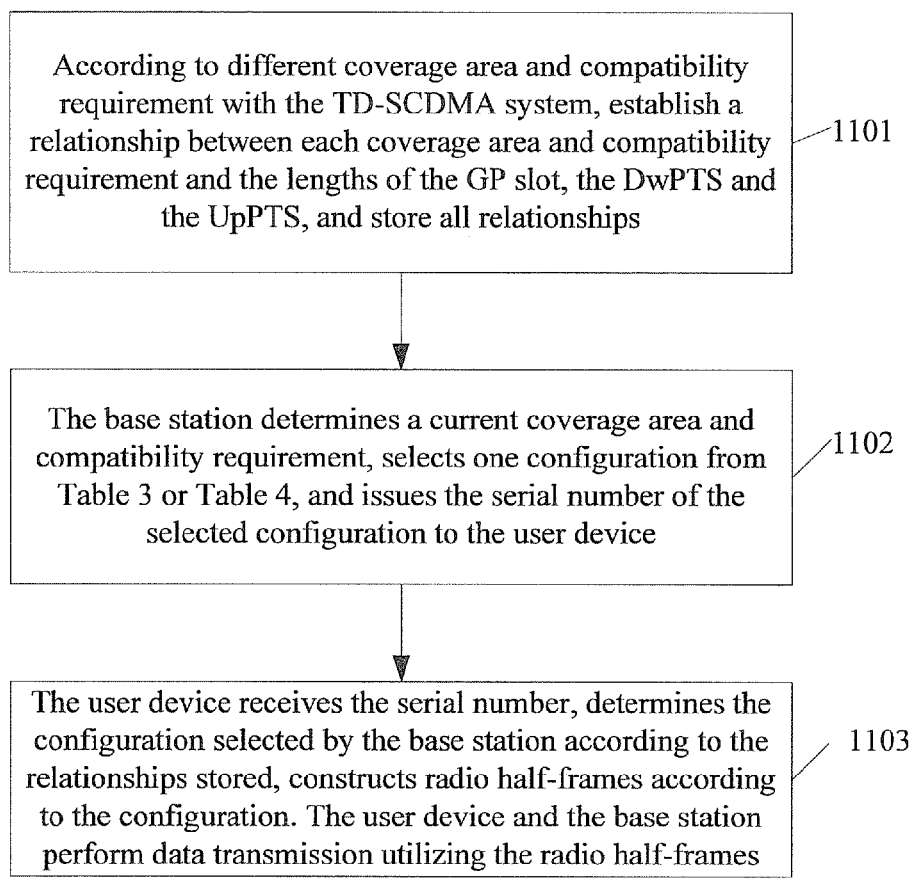
FIG. 11 is a flowchart illustrating a detailed process for data transmission in the TDD system in accordance with a second embodiment of the present invention.

FIG. 11 is a flowchart illustrating a detailed process for data transmission in the TDD system in accordance with the second embodiment of the present invention. As shown in FIG. 11, the method includes the following steps.

Step 1101, according to a compatibility requirement with the TD-SCDMA system and a coverage area requirement, establish a relationship between each compatibility and coverage area requirement of the base station and the lengths of the GP slot, the DwPTS and the UpPTS, and store all relationships.

In this step, the relationships are established according to the manner described in step 802a of the first embodiment. As mentioned above, there exist many configurations. This embodiment provides a simplified solution in which the relationships established do not include all the configurations but include only some of the configurations.

Specifically, when normal CP is adopted, there are seven choices for the length of the GP slot according to a distribution rule of the coverage area, i.e., the GP slot may respectively occupy 1, 2, 3, 4, 5, 10 or 12 symbols. When the coverage area is relatively small, difference between the coverage areas is also small; when the coverage area is relatively big, difference between the coverage areas is also relatively big. Specifically, the configurations are shown in FIG. 12, wherein field 1 denotes the DwPTS, field 2 denotes the GP slot and field 3 denotes the UpPTS. The slot ratios shown in FIG. 12 are downlink-uplink slot ratios. The relationships established may be shown in Table 3. In Table 3, there are 14 configurations which are respectively corresponding to serial numbers 0-13.

TABLE 3

| Serial number | Coverage area (km) | Compatibility requirement (downlink-uplink slot ratio) | DwPTS (S) | GP (S) | UpPTS (S) |
|---|---|---|---|---|---|
| 0 | ≦10.7 | Not compatible | 11 | 1 | 2 |
| 1 | ≦21.4 | Compatible (4:3 and 1:6) or not compatible | 10 | 2 | 2 |
| 2 | ≦21.4 | Compatible (6:1 and 3:4) or not compatible | 1 | 2 | 11 |
| 3 | ≦21.4 | Compatible (2:5) or not compatible | 5 | 2 | 7 |
| 4 | ≦21.4 | Compatible (5:2) Or not compatible | 6 | 2 | 6 |
| 5 | ≦32.1 | Compatible (4:3 and 1:6) or not compatible | 9 | 3 | 2 |
| 6 | ≦32.1 | Compatible (6:1 and 3:4) or not compatible | 4 | 3 | 7 |
| 7 | ≦32.1 | Compatible (5:2 and 2:5) or not compatible | 5 | 3 | 6 |
| 8 | ≦42.8 | Compatible (1:6 and 4:3) or not compatible | 8 | 4 | 2 |
| 9 | ≦42.8 | Compatible (5:2 and 2:5) or not compatible | 4 | 4 | 6 |
| 10 | ≦53.5 | Compatible (1:6 and 4:3) or not compatible | 7 | 5 | 2 |
| 11 | ≦53.5 | Compatible (5:2 and 2:5) or not compatible | 3 | 5 | 6 |
| 12 | ≦107 | Compatible with all slot ratios or not compatible | 2 | 10 | 2 |
| 13 | ≦128.4 | Compatible with all slot ratios or not compatible | 2 | 12 | 0 |
| 14 | | Reserved | | | |
| 15 | | Reserved | | | |

Among the above 14 configurations, there are only four choices for the length of the UpPTS, i.e., occupy 2, 6, 7 or 11 symbols, which is designed to simplify system design because the configuration of the UpPTS is complex and has remarkable influence to the data transmission.

Figure 13:
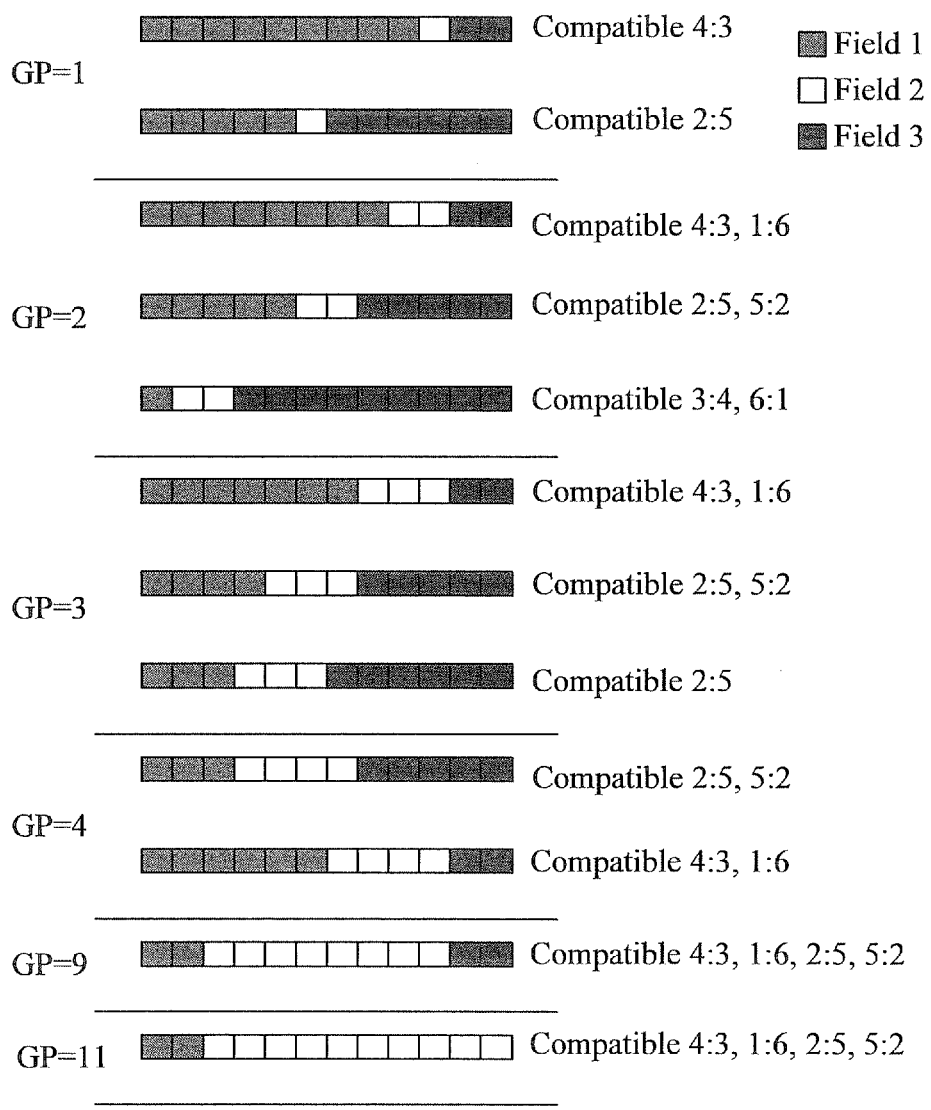
FIG. 13 is a schematic diagram illustrating a configuration of lengths for the GP slot, the DwPTS and the UpPTS when extended CP is adopted under different coverage area and compatibility requirements in accordance with the second embodiment of the present invention.

Similarly, when extended CP is adopted, there are six choices for the length of the GP slot, i.e. respectively occupy 1, 2, 3, 4, 8 or 10 symbols. Specifically, the configurations are shown in FIG. 13, wherein field 1 denotes the DwPTS, field 2 denotes the GP slot and field 3 denotes the UpPTS. The slot ratios shown in FIG. 13 are downlink-uplink slot ratios. The relationships established may be as shown in Table 4. In Table 4, there are 12 configurations which are respectively corresponding to serial numbers 0-11.

TABLE 4

| Serial number | Coverage area | Compatibility requirement (downlink-to-uplink slot ratio) | DwPTS (OS) | GP (OS) | UpPTS (OS) |
| --- | --- | --- | --- | --- | --- |
| 0 | ≦12.4 | Compatible (4:3) or not compatible | 9 | 1 | 2 |
| 1 | ≦24.8 | Compatible (2:5) or not compatible | 5 | 1 | 6 |
| 2 | ≦24.8 | Compatible (4:3 and 1:6) or not compatible | 8 | 2 | 2 |
| 3 | ≦24.8 | Compatible (5:2 and) or not compatible | 5 | 2 | 5 |
| 4 | ≦24.8 | Compatible (3:4 and 6:1) or not compatible | 1 | 2 | 9 |
| 5 | ≦37.2 | Compatible (4:3 and 1:6) or not compatible | 7 | 3 | 2 |
| 6 | ≦37.2 | Compatible (5:2 and 2:5) or not compatible | 4 | 3 | 5 |
| 7 | ≦37.2 | Compatible (2:5) or not compatible | 3 | 3 | 6 |
| 8 | ≦49.6 | Compatible (5:2 and 2:5) or not compatible | 3 | 4 | 5 |
| 9 | ≦49.6 | Compatible (4:3 and 1:6) or not compatible | 6 | 4 | 2 |
| 10 | ≦99.2 | Compatible (4:3, 1:6, 2:5 and 5:2) or not compatible | 2 | 8 | 2 |
| 11 | ≦124 | Compatible (4:3, 1:6, 2:5 and 5:2) or not compatible | 2 | 10 | 0 |
| 12 | | Reserved | | | |
| 13 | | Reserved | | | |
| 14 | | Reserved | | | |
| 15 | | Reserved | | | |

Similar to the situation of normal CP, when the extended CP is adopted in this embodiment, there are also four choices for the length of the UpPTS, i.e., occupy 2, 5, 6 or 9 OFDM symbols.

When storing the relationships, it is preferable to store all contents of Table 3 and Table 4 in the base station and store the serial numbers and the contents of columns of the lengths of the GP slot, the DwPTS and the UpPTS in the user device.

Step 1102, the base station determines a current compatibility and coverage area requirement, selects a corresponding configuration from Table 3 or Table 4, and issues the serial number of the configuration selected to the user device.

In this step, the base station issues the serial number of the configuration via cell broadcasting to the user device in the cell. Since there are 14 configurations in Table 3 and 12 configurations in Table 4, the base station may use 4 bits for informing the user device of the serial number of the configuration selected.

Step 1103, the user device receives the serial number, determines the configuration selected by the base station based on the relationships stored, and constructs radio half-frames according to the configuration. Then the user device performs data transmission with the base station utilizing the radio half-frames constructed.

Now, the process of the method in accordance with the second embodiment is finished. According to the second embodiment, relationships are established in advance, thus the process for configuring radio frames is simplified. Meanwhile, through the simplified configurations shown in Table 3 and Table 4, flexible adjustment of the coverage areas with multiple granularities is realized and different compatibility requirements are satisfied. At the same time, less storage space of the base station and the user device is occupied because too many configurations will occupy large storage space. And less information bits are required for informing the user device of the configuration selected.

The second embodiment has been optimized according to characteristics such as simplifying the UpPTS, guaranteeing the coverage area and the compatibility. However, the base station in the second embodiment informs the user device serial number among all the configurations. Generally, the downlink-uplink slot ratio of the TDD system is necessary for configuring the special slot. In other words, the slot ratio is known when the system configures the special slot. Thus, the configurations in Table 3 and Table 4 of the second embodiment may be divided into subsets according to their slot ratios. Therefore, fewer bits are required for informing the configuration selected.

Specifically, the relationships in Table 3 and Table 4 are divided into subsets according to different compatibility requirements, and a subset number is assigned for each subset. In each subset, different configurations of lengths for the GP slot, the DwPTS and the UpPTS are labeled with corresponding configuration numbers. The base station stores the relationships by subsets. Similarly, the user device also stores different configurations of lengths for the GP slot, the DwPTS and the UpPTS and corresponding configuration numbers by subsets. When determining a combination of lengths for the GP slot, the DwPTS and the UpPTS according to the current coverage area and compatibility requirement, the base station firstly finds out a subset according to the current compatibility requirement, and then selects a configuration for the lengths of the GP slot, the DwPTS and the UpPTS from the subset according to the current coverage area requirement, and issues the corresponding subset number and the configuration number to the user device. The user device receives the subset number and the configuration number, determines the subset according to the subset number and determines the lengths of the GP slot, the DwPTS and the UpPTS within the subset according to the configuration number, configures the special field of the radio half-frame and performs data transmission with the base station utilizing the radio half-frame.

For example, the relationships after subset division may be as shown in Table 5 and Table 6, wherein Table 5 is corresponding to the situation where normal CP is adopted and Table 6 is corresponding to the situation where extended CP is adopted. Take Table 5 as an example. The first line represents compatibility requirement with the TD-SCDMA system, which includes four categories. Accordingly, the relationships are divided into four subsets, as shown in columns of the slot ratios in Table 5. Take the downlink-to-uplink slot ratio 4:3 as an example, the columns corresponding to this compatibility requirement shows the different configurations in the subset. The lengths of the GP slots are all shown in the first column on the left. Thus, the configurations in the columns under 4:3 only list the lengths of the DwPTS and the UpPTS.

TABLE 5

Length of the GP slot | 4:3 DwPTS:GP:UpPTS 11:1:2 DwPTS (S) | UpPTS (S) | 6:1, 3:4 DwPTS:GP:UpPTS 2:2:10 DwPTS (S) | UpPTS (S) | 5:2 DwPTS:GP:UpPTS 6:2:6 DwPTS (S) | UpPTS (S) | 2:5 DwPTS:GP:UpPTS 5:2:7 DwPTS (S) | UpPTS (S)
--- | --- | --- | --- | --- | --- | --- | --- | ---
Downlink-to-uplink slot ratio of TD-SCDMA | | | | | | | |
1 | 11 | 2 | | | | | |
2 | 10 | 2 | 2 | 10 | 6 | 6 | 5 | 7
3 | 9 | 2 | | | 5 | 6 | 5 | 6
4 | 8 | 2 | | | 4 | 6 | 4 | 6
5 | 7 | 2 | 2 | 7 | 3 | 6 | 3 | 6
10 | 2 | 2 | 2 | 2 | 2 | 2 | 2 | 2
12 | 2 | 0 | 2 | 0 | 2 | 0 | 2 | 0

TABLE 6

Length of the GP slot | 4:3 DwPTS:GP:UpPTS 9:1:2 DwPTS | UpPTS | 6:1, 3:4 DwPTS:GP:UpPTS 2:1:9 DwPTS | UpPTS | 5:2 DwPTS:GP:UpPTS 5:2:5 DwPTS | UpPTS | 2:5 DwPTS:GP:UpPTS 5:1:6 DwPTS | UpPTS
--- | --- | --- | --- | --- | --- | --- | --- | ---
Downlink-to-uplink slot ratio of TD-SCDMA | | | | | | | |
1 | 9 | 2 | 2 | 9 | | | 5 | 6
2 | 8 | 2 | | | 5 | 5 | 5 | 5
3 | 7 | 2 | | | 4 | 5 | 4 | 5
4 | 6 | 2 | 2 | 6 | 3 | 5 | 3 | 5
8 | 2 | 2 | 2 | 2 | 1 | 3 | 2 | 2
10 | 2 | 0 | 2 | 0 | 2 | 0 | 2 | 0

In the above process, the subset division is carried out based on the compatibility requirement with the TD-SCDMA system. Configurations of the same compatibility requirement are classified into one subset. In addition, configurations of different compatibility requirements may also be classified into one subset. For example, as shown in Table 5 and Table 6, for the downlink-to-uplink slot ratios 6:1 and 3:4 of the TD-SCDMA system, the configurations are the same. Thus the two configurations corresponding to the two compatibility requirements may be classified into the same subset.

In addition, when informing the user device of the configuration currently adopted, the above mentioned manner is to issue the subset number and the configuration number to the user device. In fact, the user device may obtain the subset number through other manners. In this case, the base station needs only send the configuration number to the user device. For example, the base station of the LTE TDD system will certainly inform the user device of the downlink-to-uplink slot ratio of the system. As shown in FIG. 9, when normal CP is adopted, if the downlink-uplink slot ratio of the LTE TDD system is 3:1, it is compatible with the TD-SCDMA system whose downlink-uplink slot ratio is 5:2. At the same time, the compatibility requirement (i.e. compatible with the TD-SCDMA system whose downlink-uplink slot ratio is 5:2) is uniquely corresponding to one subset. Thus, the subset number is deemed to have been obtained by the user device when the user device obtains the downlink-uplink slot ratio of the LTE TDD system. In this case, only the configuration number needs to be informed to the user device, and no subset number is required. When there is no compatibility requirement, the base station may preferably select a configuration which is compatible with the TD-SCDMA system.

Under all slot ratios, when normal CP is adopted, it always has GP=1, 2, 3, 4, 5, 10, 12; when extended CP is adopted, it always GP=1, 2, 3, 4, 8, 10. In Table 3 and Table 4 of the second embodiment, compatible configurations are selected preferably. Therefore, only 3 bits are required for indicating the configuration number no matter normal CP or extended CP is adopted.

Besides, the configurations of the special field listed in Table 3 and Table 4 of the second embodiment are based on the following lengths of the GP slot: when normal CP is adopted, GP=1, 2, 3, 4, 5, 10, 12; when extended CP is adopted, GP=1, 2, 3, 4, 8, 10. Certainly, other lengths for the GP slot may also be used for configuring the special field. For example, when normal CP is adopted, GP=1, 2, 4, 5, 7, 10, 12; when extended CP is adopted, GP=1, 2, 4, 6, 8, 10. In this case, relationships will also be established and recorded following the method described in the second embodiment, and only the detailed configurations of the special field may be different. Thus, no further description is to be provided.

Figure 14:
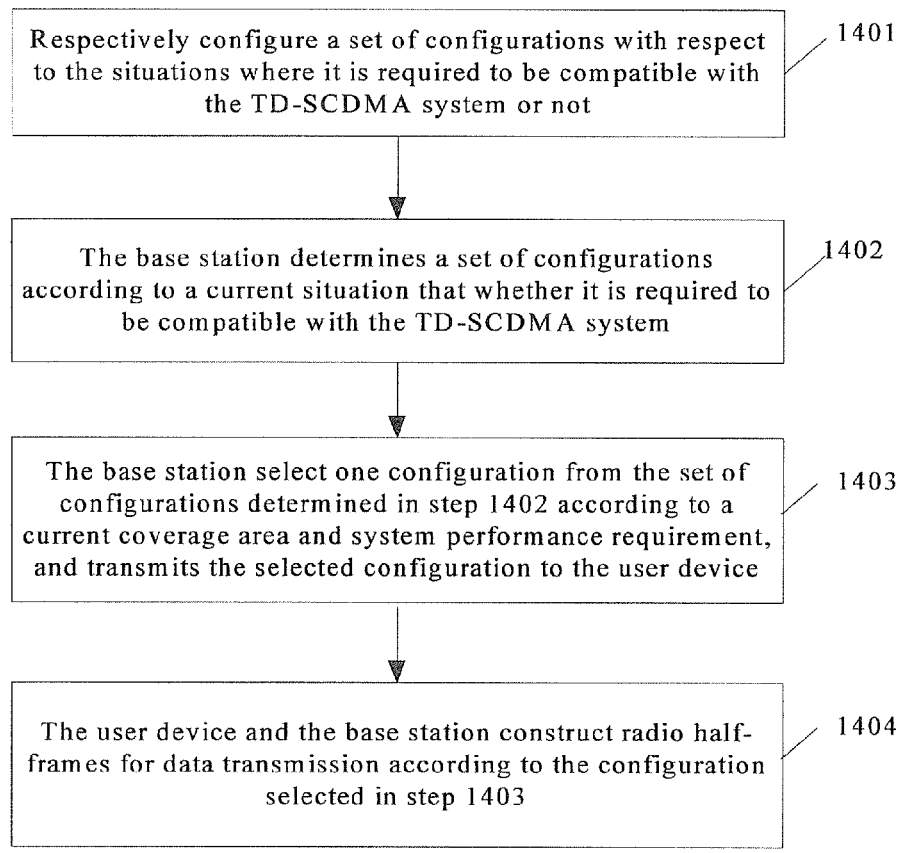
FIG. 14 is a flowchart illustrating an overall process for data transmission in the TDD system in accordance with a third embodiment of the present invention.

FIG. 14 is a flowchart illustrating a detailed process for data transmission in the TDD system in accordance with a third embodiment of the present invention. As shown in FIG. 14, the method may include the following steps.

Step 1401, respectively configure a set of configurations for the special field with respect to a situation where it is required to be compatible with TD-SCDMA system and a situation where it is not required to be compatible with the TD-SCDMA system. Each configuration of the special field may include: the lengths of the GP slot, the DwPTS and the UpPTS which take each symbol as a unit.

The special field mentioned in the present invention refers to the field consists of three special slots in a 5 ms radio half-frame of the frame structure type 2. In the present invention, the length of the GP slot in the special field may be adjusted with a granularity of one OFDM symbol.

The OFDM symbol is taken as a unit for the length of the GP slot because a coding/modulating configuration adopted by the LTE TDD system is OFDM modulation or extended OFDM modulation, and both of them have the same symbol length, i.e. one OFDM symbol. Therefore, one OFDM symbol is taken as a unit for resource allocation. In the following descriptions, the length of time occupied by an OFDM symbol is also referred to as a symbol.

Step 1402, a base station determines a set of configurations for the special fields based on a current situation that whether it is required to be compatible with the TD-SCDMA system.

Step 1403, the base station selects one configuration from the set of configurations determined in step 1402 and issues the selected configuration to a user device.

Step 1404, based on the configuration selected in step 1403, the base station and the user device construct radio half-frames for data transmission.

Now, the process of the method for data transmission provided by the third embodiment of the present invention is finished.

In the system including the base station and the user device provided by the third embodiment of the present invention, the base station is adapted to respectively set a set of configurations for the special field with respect to the situations that whether it is required to be compatible with the TD-SCDMA system, wherein each configuration includes the lengths for the GP slot, the DwPTS and the UpPTS configured taking each symbol as a unit. The base station is also adapted to determine one set of configurations according to a current situation that whether it is required to be compatible with the TD-SCDMA system, select a configuration from the set of configurations determined according to a coverage area and system performances, issue the configuration selected to the user device and construct radio half-frames for data transmission according to the configuration selected.

The user device is adapted to receive the configuration from the base station, and construct radio half-frames for data transmission according to the configuration received.

Figure 15:
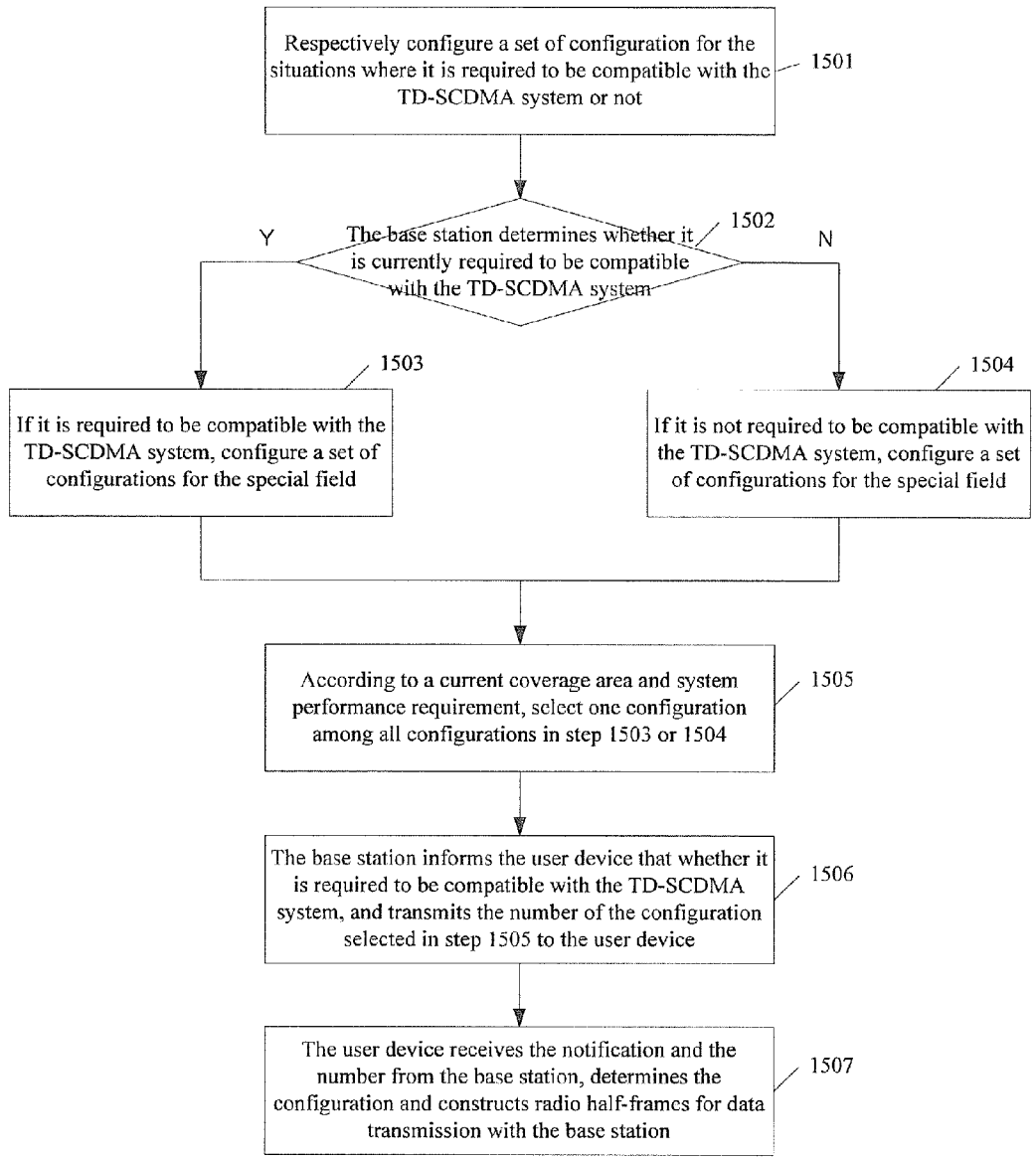
FIG. 15 is a flowchart illustrating a detailed process for data transmission in the TDD system in accordance with the third embodiment of the present invention.

It can be seen from the above that, a smaller granularity is adopted for configuring length for the GP slot in the method of the present invention. Thus, it is possible to support different coverage areas flexibly and improve transmission efficiency. At the same time, corresponding configurations are configured respectively with respect to different compatibility requirements with the TD-SCDMA system. Since the length of the GP slot is flexibly adjusted within the special field, the adjustment of the GP slot is restricted by the length of the special field, i.e., the maximum coverage area supported by the radio half-frame is restricted by the length of the special field. Preferably, compared with the frame structure shown in FIG. 1, a prolonged special field may extend the space for adjusting the length of the GP slot and therefore enlarge the maximum coverage area. However, since the length of the radio half-frame is fixed, the change in the length of the special field will certainly influence the length of other slots in the radio half-frame. The following description takes a new radio frame structure shown in FIG. 7 as an example to illustrate the implementation of the third embodiment. FIG. 15 is a flowchart illustrating a detailed process for data transmission in the TDD system in accordance with the third embodiment of the present invention. As shown in FIG. 15, the method includes the following steps.

Step 1501, respectively configure a set of configurations for the special field with respect to the situations that whether it is required to be compatible with the TD-SCDMA system.

In practical applications, the TD-SCDMA system may exist within the coverage area of the base station of the LTE TDD system. Thus, system compatibility of the two systems should be considered when configuring the lengths for the GP slot, the DwPTS and the UpPTS to ensure signal qualities of both the two networks. If no TD-SCDMA system exists in the coverage area of the base station of the LTE TDD system, the configurations for the special field may be configured without considering the compatibility requirement.

Based on the above consideration, the configurations for the special field are firstly divided into two categories: one is compatible with the TD-SCDMA system and the other is not compatible with the TD-SCDMA system. When there is no need to consider the compatibility with the TD-SCDMA system, the configurations may be configured without the restriction of compatibility. Instead, the configurations may be configured based on requirements such as performances, implementation complexity, etc. When the compatibility with the TD-SCDMA system should be considered, the configurations must be configured according to downlink-uplink slot ratios of the TD-SCDMA system. Thus, an optimal configuration may be selected based on whether there is a compatibility requirement.

Specifically, the two categories of configurations may be configured according to the following two sub-steps.

Step 1501a, with respect to the situation where it is not required to be compatible with the TD-SCDMA system, configure a set of configurations for the special field and assign numbers for the configurations.

Herein, when there is no compatibility requirement, the configurations may be designed according to requirements such as system performances and implementation complexity, etc. Considering the structure and contents of the special field shown in FIG. 7, the configurations for the special field are respectively shown in Table 7 and Table 8 when normal CP and extended CP are adopted.

TABLE 7

| Length of the GP slot (symbol) | Length of the DwPTS + length of the GP slot + length of the UpPTS (symbol) |
|---|---|
| 0 | 12 + 0 + 2 |
| 1 | 11 + 1 + 2 |
| 2 | 10 + 2 + 2 |
| 3 | 9 + 3 + 2 |
| 4 | 8 + 4 + 2 |
| 5 | 7 + 5 + 2 |
| 6 | 6 + 6 + 2 |
| 7 | 5 + 7 + 2 |
| 8 | 4 + 8 + 2 |
| 9 | 3 + 9 + 2 |
| 10 | 2 + 10 + 2 |
| 11 | 1 + 11 + 2 |
| 12 | 2 + 12 + 0 |
| 13 | 1 + 13 + 0 |

TABLE 8

| Length of the GP slot (symbol) | Length of the DwPTS + length of the GP slot + length of the UpPTS (symbol) |
|---|---|
| 0 | 10 + 0 + 2 |
| 1 | 9 + 1 + 2 |
| 2 | 8 + 2 + 2 |

TABLE 8-continued

| Length of the GP slot (symbol) | Length of the DwPTS + length of the GP slot + length of the UpPTS (symbol) |
| --- | --- |
| 3 | 7 + 3 + 2 |
| 4 | 6 + 4 + 2 |
| 5 | 5 + 5 + 2 |
| 6 | 4 + 6 + 2 |
| 7 | 3 + 7 + 2 |
| 8 | 2 + 8 + 2 |
| 9 | 1 + 9 + 2 |
| 10 | 2 + 10 + 0 |
| 11 | 1 + 11 + 0 |

When normal CP is adopted, among the configurations in Table 7, there are 14 choices for the length of the GP slot. Thus, various coverage areas may be supported, and the difference between coverage areas of adjacent levels equals to a coverage area corresponding to one symbol. Compared with the method in the prior art, the difference is decreased dramatically.

Meanwhile, the method is easy to be implemented, as can be seen from Table 7. Specifically, there are only two choices for the length of the UpPTS, i.e. 0 or 2 symbols. This is because the UpPTS, such as pilot and control channels, is hard to design. Therefore, only two choices are defined for the length of the UpPTS. And it is only required to design for the UpPTS having a length of 2 symbols. Also, the GP slot may be extended by puncturing symbols occupied by the DwPTS, which does not require modification to pilot design of the DwPTS.

In Table 8, extended CP is adopted. The situation is similar to Table 1 and will not be described herein.

Then, assign a number for each configuration shown in Table 7. The 14 configurations may be expressed by 4 bits. And assign a number for each configuration shown in Table 8. The 12 configurations may also be expressed by 4 bits. The configurations shown in Table 7 and Table 8 and their corresponding numbers are stored in the base station and the user device.

Step 1501b, with respect to the situation where it is required to be compatible with the TD-SCDMA system, configure a set of configurations for the special field and assign numbers for the configurations.

The compatibility refers that, uplink and downlink relationships of the two systems in an area where the two systems co-exist should keep consistent, i.e., the two systems should have their downlink-to-uplink switch points aligned with each other, so as to guarantee that the two systems do not interfere with each other. Since the LTE TDD system is an evolution of the TD-SCDMA system, the TD-SCDMA system usually exists in an area before the LTE TDD system is developed in the same area. Thus, it is preferable to have the radio frame of the LTE TDD system designed to be compatible with that of the TD-SCDMA system.

Specifically, the radio frame structure of the TD-SCDMA system is the same as the frame structure described in FIG. 2. There are six downlink-uplink slot ratios and corresponding positions of downlink-to-uplink switch points. The compatibility requirement with the TD-SCDMA system refers to the value of a downlink-uplink slot ratio of the TD-SCDMA system.

The radio frame structure of the TD-SCDMA system is the same as the frame structure shown in FIG. 2. There are six downlink-uplink slot ratios and corresponding positions of the downlink-to-uplink switch-points. The length of the GP slot in the TD-SCDMA system is 75 us, and there are two requirements for achieving compatibility. First, the length of the GP slot in the LTE TDD system should not be shorter than 75 us; taking one OFDM symbol as a unit, the length of the GP slot in the LTE TDD system should be at least two OFDM symbols when normal CP is adopted and at least one OFDM symbol when extended CP is adopted. Second, the downlink-uplink slot ratio should be consistent with that in the TD-SCDMA system, thus the configuration of the lengths for the GP slot, the DwPTS and the UpPTS should take the structure of the regular slots into consideration. Specifically, the structure includes the length of the regular slots and a relationship between the locations of the regular slots and the special field, etc.

The above structure of the regular slot is as shown in FIG. 7. Two adjacent regular slots form a subframe, and are usually allocated to be either both uplink slots or both downlink slots during resource allocation. All types of possible configurations may be obtained based on the downlink-to-uplink slot ratio of the TD-SCDMA system under the above compatibility requirement (i.e., the downlink-to-uplink switch-points are consistent, and the GP slot of the LTE TDD system covers that of the TD-SCDMA system). For simplicity, the following description takes the method for obtaining configurations under a minimum coverage area requirement as an example.

Figure 16:
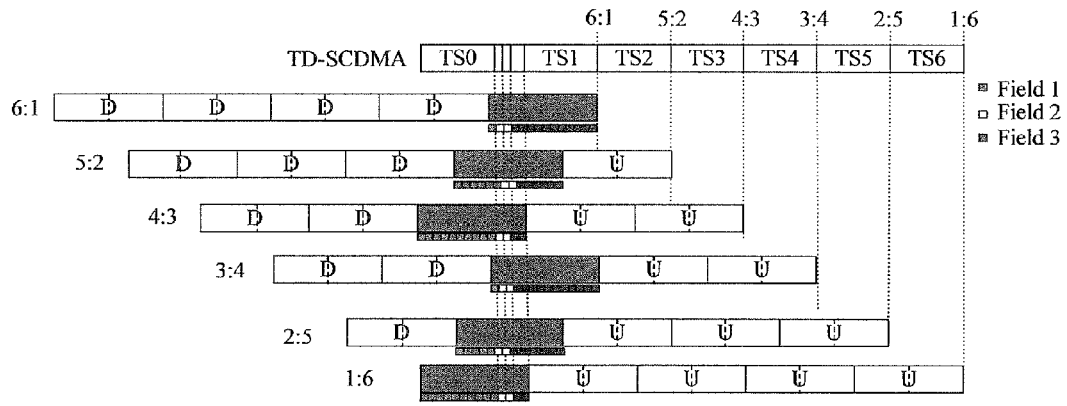
FIG. 16 is a schematic diagram illustrating a configuration of lengths for the GP slot, the DwPTS and the UpPTS when normal CP is adopted under a minimum coverage area requirement in accordance with the third embodiment of the present invention.

Based on the downlink-to-uplink slot ratios of the TD-SCDMA system, the configurations shown in FIG. 16 may be obtained when normal CP is adopted under the minimum coverage area requirement, including configurations for the lengths of the GP slot, the DwPTS and the UpPTS.

In FIG. 16, the first line illustrates a frame structure of the TD-SCDMA system, wherein switch points corresponding to different downlink-uplink slot ratios are marked. For example, 6:1 marked above the frame structure means that the downlink-uplink slot ratio is 6:1, and the downlink-to-uplink switch-point is at the vertical dotted line corresponding to 6:1. The second to the seventh line respectively represents different configurations of the radio half-frame of the LTE TDD system corresponding to different slot ratios of the TD-SCDMA system.

Specifically, in the second to the seventh line, subframes labeled with D are downlink subframes (one subframe consists of two regular slots), subframes labeled with U are uplink subframes, and the shading area represents the special field. When normal CP is adopted, the special field includes 14 symbols as illustrated below the special field. In the special field, field 1 denotes the DwPTS and may be seen as downlink slots, field 2 denotes the GP slot, and field 3 denotes the UpPTS may be seen as uplink slots. As shown in FIG. 16, when the downlink-uplink slot ratio of the TD-SCDMA system is 6:1, the LTE TDD system may adopt the slot configuration illustrated in the first line, i.e., the DwPTS occupies 1 OFDM symbol, the GP slot occupies 2 OFDM symbols, and the UpPTS occupies 11 OFDM symbols. Thus, the downlink-to-uplink switch point of the LTE TDD system (at the end of the special field) is consistent with that of the TD-SCDMA system. Meanwhile, the GP slot of the LTE TDD system covers that of the TD-SCDMA system. As shown in FIG. 16, configurations under other slot ratios also satisfy the above requirements and will not be described herein.

The configurations of the lengths of the GP slot, the DwPTS and the UpPTS in the radio half-frame of the LTE TDD system shown in FIG. 16 may also be illustrated as Table 9. When the downlink-to-uplink slot ratio of the TD-SCDMA system is 1:6, the LTE TDD system corresponds to the second line of FIG. 16 according to the present embodiment. Apparently there is no regular slot for transmitting downlink data, so this configuration will not be adopted in practice and thus is excluded from Table 9.

TABLE 9

| Slot ratio (downlink:uplink) | Length of the DwPTS | Length of the GP slot | Length of the UpPTS |
|---|---|---|---|
| 2:5 | 5 | 2 | 7 |
| 3:4, 6:1 | 1 | 2 | 11 |
| 4:3 | 10 | 2 | 2 |
| 5:2 | 6 | 2 | 6 |

Figure 17:
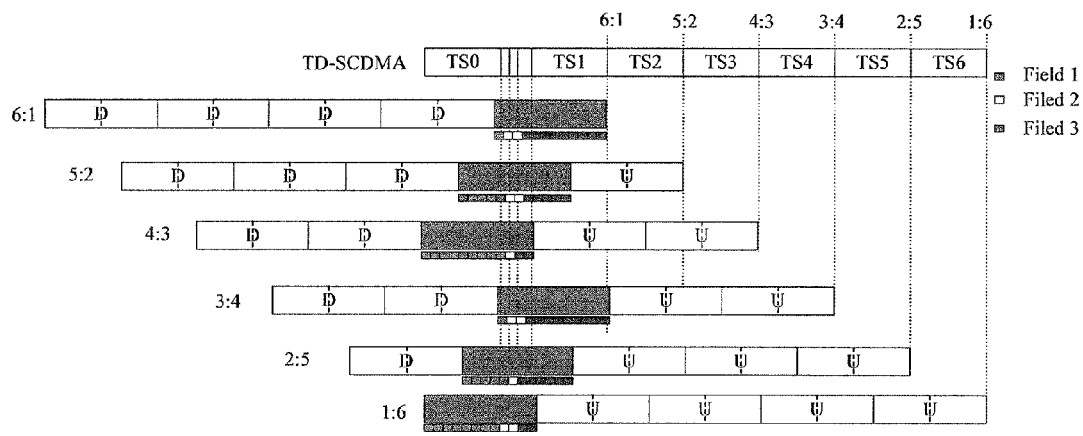
FIG. 17 is a schematic diagram illustrating a configuration of lengths for the GP slot, the DwPTS and the UpPTS when extended CP is adopted under a minimum coverage area requirement in accordance with the third embodiment of the present invention.

Likewise, according to the compatibility requirement, when normal CP is adopted, configurations of the lengths of the GP slot, the DwPTS and the UpPTS may be as shown in FIG. 17 under the minimum coverage area requirement. The configurations shown in FIG. 17 may be illustrated as in Table 10.

TABLE 10

| Slot ratio of the TD-SCDMA system (downlink:uplink) | DwPTS(S) | GP(S) | UpPTS(S) |
|---|---|---|---|
| 2:5 | 5 | 1 | 6 |
| 3:4, 6:1 | 1 | 2 | 9 |
| 4:3 | 9 | 1 | 2 |
| 5:2 | 5 | 2 | 5 |

As shown in FIG. 17, when it is required to be compatible with the slot ratio 4:3 of the TD-SCDMA system, the first symbol of the UpPTS in the radio half-frame of the LTE TDD system will enter the range of the GP slot of the TD-SCDMA system. In extreme situations, part of the symbol will be interfered by the DwPTS of the TD-SCDMA system. Fortunately, thanks to the CP structure of the OFDM, the interference will only influence the CP. Thus the interference may be neglected.

In the configurations shown in FIG. 16, FIG. 17, Table 9 and Table 10, the length of the GP slot is 1 or 2 symbols, and the coverage area supported by the GP is as follows.

(1) For normal CP, the coverage area is (2×71.4 us/2)×3×10+8=21.4 km.

(2) For extended CP, the coverage area corresponding to the GP slot having a length of 1 symbol is: 83.3 us/2)×3×10+8=12.5 km; the coverage area corresponding to the GP slot having a length of 2 symbols is: (2×83.3 us/2)×3×10+8=25 km.

The above configurations are obtained based on a minimum coverage area requirement. Based on the configurations under the minimum coverage area requirement, the length of the GP slot may be adjusted according to different coverage area requirements to obtain different slot configurations. Specifically, the length of the GP slot under the minimum coverage area configuration may be extended according to the coverage area requirement, i.e., puncture the symbols in the DwPTS or the UpPTS adjacent to the GP slot, or puncture the symbols in both the DwPTS and the UpPTS adjacent to the GP slot to extend the length of the GP slot.

For example, when normal CP is adopted, in order to extend the coverage area by one level, i.e., make the length of the GP slot be 3 OFDM symbols, there may be two configuration manners according to the third line in the configurations illustrated in FIG. 9 (i.e. it is required to be compatible with the situation of downlink-uplink slot ratio 5:2).

1. Take one OFDM symbol on the left of the GP slot as part of the GP slot to make the GP slot occupy 3 symbols. At this time, the DwPTS occupies 5 symbols and the UpPTS occupies 6 symbols.

2. Take one OFDM symbol on the right of the GP slot as part of the GP slot to make the GP slot occupy 3 symbols. At this time, the DwPTS occupies 6 symbols and the UpPTS occupies 5 symbols.

Many configurations for the special filed may be obtained in the same manner. If the DwPTS is configured with a minimum length of 80.57 us and the UpPTS is configured with a minimum length of 141.66 us (suppose GT is 8.33 us), the length of the GP slot will be 777.8 us which support a maximum coverage area of about 116 km. For extraordinarily big coverage areas, the PRACH may be implemented in the uplink slot following the special field to further extend the GP slot.

In this embodiment, based on the consideration of the length of the GP slot and implementation complexity, the configurations compatible with the TD-SCDMA system are respectively shown in Table 11 and Table 12 when normal CP or extended CP is adopted.

TABLE 11

| | TD-SCDMA ratios | | | | | | | |
|---|---|---|---|---|---|---|---|---|
| | 4:3 Dw:GP:Up | | 6:1, 3:4 Dw:GP:Up | | 5:2 Dw:GP:Up | | 2:5 Dw:GP:Up | |
| GP after | 11:1:2 | | 1:2:11 | | 6:2:6 | | 5:2:7 | |
| puncture | DwPTS | UpPTS | DwPTS | UpPTS | DwPTS | UpPTS | DwPTS | UpPTS |
| 2 | 10 | 2 | 1 | 11 | 6 | 6 | 5 | 7 |
| 3 | 9 | 2 | | | 5 | 6 | 4 | 7 |
| 4 | 8 | 2 | | | 4 | 6 | 3 | 7 |
| 5 | 7 | 2 | | | 3 | 6 | 2 | 7 |
| 11 | 1 | 2 | | | 1 | 2 | 1 | 2 |

TABLE 12

| | TD-SCDMA ratios | | | | | | | |
|---|---|---|---|---|---|---|---|---|
| | 4:3 Dw:GP:Up | | 6:1, 3:4 Dw:GP:Up | | 5:2 Dw:GP:Up | | 2:5 Dw:GP:Up | |
| GP after | 9:1:2 | | 1:2:9 | | 5:2:5 | | 5:1:6 | |
| puncture | DwPTS | UpPTS | DwPTS | UpPTS | DwPTS | UpPTS | DwPTS | UpPTS |
| 1 | 9 | 2 | | | | | 5 | 6 |
| 2 | 8 | 2 | 1 | 9 | 5 | 5 | 4 | 6 |
| 3 | 7 | 2 | | | 4 | 5 | 3 | 6 |

TABLE 12-continued

| | TD-SCDMA ratios | | | | | | | |
|---|---|---|---|---|---|---|---|---|
| GP after | 4:3 Dw:GP:Up 9:1:2 | | 6:1, 3:4 Dw:GP:Up 1:2:9 | | 5:2 Dw:GP:Up 5:2:5 | | 2:5 Dw:GP:Up 5:1:6 | |
| puncture | DwPTS | UpPTS | DwPTS | UpPTS | DwPTS | UpPTS | DwPTS | UpPTS |
| 4 | 6 | 2 | | | 3 | 5 | 2 | 6 |
| 8 | 2 | 2 | | | 2 | 2 | 2 | 2 |

Take Table 11 as an example. The first line denotes the compatibility requirement with the TD-SCDMA system which include four categories, i.e. the downlink-to-uplink slot ratios are respectively 4:3, 6:1 or 3:4, 5:2, 2:5. The columns correspond to each compatibility requirement represent a configuration with respect to the compatibility requirement. Since the lengths of the GP slots are shown in the first column on the left, the configurations corresponding to the column 4:3 only list the lengths of the DwPTS and the UpPTS.

According to the above, the configurations with respect to the situations where it is required to be compatible with TD-SCDMA system are configured, respectively as shown in the Tables when normal CP or extended CP is adopted. Then, assign a number for each configuration shown in Table 11. The 14 configurations may be expressed by 4 bits. And assign a number for each configuration shown in Table 12. The 13 configurations may also be expressed by 4 bits. The configurations shown in Table 11 and Table 12 and their corresponding numbers are stored in the base station and the user device.

It should be noted that Table 11 and Table 12 merely show exemplary configurations of the embodiment of the present invention. Other configurations may also be configured according to the compatibility requirement.

The operations in step 1501a and step 1501b may be performed simultaneously.

Step 1502, the base station determines whether it is required to be compatible with the TD-SCDMA system, if it is required to be compatible with the TD-SCDMA system, proceed to step 1504; otherwise, proceed to step 1503.

Step 1503, as to the situation where it is not required to be compatible with the TD-SCDMA system, pre-configure a set of configurations and proceed to step 1505.

As described above, in step 1501, in the case that it is not required to be compatible with the TD-SCDMA system, the configurations are as shown in Table 7 and Table 8. Therefore, if normal CP is adopted by the base station and the user device, Table 7 will be determined as the configurations pre-configured; if extended CP is adopted by the base station and the user device, Table 8 will be determined as the configurations pre-configured.

Step 1504, as to the situation that it is required to be compatible with the TD-SCDMA system, pre-configure a set of configurations and proceed to step 1505.

As described above, in step 1501, in the case that it is required to be compatible with the TD-SCDMA system, the configurations are as shown in Table 11 and Table 12. Therefore, if normal CP is adopted by the base station and the user device, Table 11 will be determined as the configurations pre-configured; if extended CP is adopted by the base station and the user device, Table 12 will be determined as the configurations pre-configured.

Step 1505, select one of the configurations configured in step 1503 or 1504 according to a current coverage area and system performance requirement.

In this step, the minimum length of the GP slot may be determined based on the coverage area. Specifically, calculate a GP length required for downlink-to-uplink switching according to the coverage area, wherein $T_{GP}=2*R_{cell}/C$. Configure the minimum length of the GP slot as occupying N symbols, wherein the GP length calculated is shorter than N symbols but longer than N−1 symbols.

Then, select one configuration in all the configurations pre-configured in step 1503 or 1504 according to the minimum length of the GP slot. If there are multiple configurations satisfying the minimum length of the GP slot, the selection may be performed taking into account the system performance requirement, such as service requirement of downlink/uplink data transmission, etc.

Step 1506, the base station informs the user device that whether it is required to be compatible with the TD-SCDMA system, and issues the number of the configuration selected in step 1505 to the user device.

In this step, the base station may issue the configuration to the user device via upper layer signaling through, e.g. a broadcast channel.

The step of issuing the configuration selected to the user device specifically include: issuing information about whether it is required to be compatible with the TD-SCDMA system to the user device, and issuing the number of the configuration selected to the user device.

Specifically, 1 bit may be used for indicating whether it is required to be compatible with the TD-SCDMA system. For example, value 1 denotes that it is required to be compatible with the TD-SCDMA system, whereas value 0 denotes that it is not required to be compatible with the TD-SCDMA system. As to the numbers of the configurations, it is known from the number configured in step 1501a and step 1501b that 4 bits may be used for issuing information of the numbers to the user device for both situations that it is required to be compatible with the TD-SCDMA system or not. Based on the above, 5 bits may be adopted in total for issuing the configuration selected to the user device.

Step 1507, the user device receives the notification and the number issued by the base station, determines the configuration and constructs radio half-frames for data transmission with the base station.

In this step, the user device determines which tables, i.e. Table 7 and Table 8, or Table 11 and Table 12, are to be searched for the configuration according to the information about whether it is required to be compatible with the TD-SCDMA system. Specifically, if the information received indicates that it is not required to be compatible with the TD-SCDMA system, Table 7 and Table 8 will be searched; if the information received indicates that it is required to be compatible with the TD-SCDMA system, Table 11 and Table 12 will be searched.

Then, a specific table is determined based on whether normal CP or extended CP is currently adopted.

After that, search for a configuration in the table finally determined according to the number received, and construct radio half-frames according to the configuration for data transmission with the base station.

Now, the process of the method in accordance with the third embodiment of the present invention is finished.

In the third embodiment, a set of configurations as shown in Table 7 and Table 8 are obtained when it is not required to be compatible with the TD-SCDMA system; and a set of configurations as shown in Table 11 and Table 12 are obtained when it is required to be compatible with the TD-SCDMA system. Each of the two sets of configurations includes more than ten configurations and requires 7 bits for transmission the number of a configuration.

To further reduce the number of configurations in each set and to reduce the number of bits for issuing the number, the length of the GP slot may be further restricted when configuring the configurations in step 1501a and step 1501b to reduce the total number of configurations.

To be specific, for Table 7 and Table 8 configured in step 1501a, the length of the GP slot may be further restricted. For example, when normal CP is adopted, according to Table 7, the length of the GP slot may be restricted to be 0, 1, 2, 3, 4, 5, 11 or 13 symbols to obtain the configurations shown in Table 13.

TABLE 13

| Length of the GP slot (symbol) | Length of the DwPTS + length of the GP slot + length of the UpPTS (symbol) |
| --- | --- |
| 0 | 12 + 0 + 2 |
| 1 | 11 + 1 + 2 |
| 2 | 10 + 2 + 2 |
| 3 | 9 + 3 + 2 |
| 4 | 8 + 4 + 2 |
| 5 | 7 + 5 + 2 |
| 11 | 1 + 11 + 2 |
| 13 | 1 + 13 + 0 |

When adopting the configurations shown in Table 13, there are 8 configurations in total and only 3 bits are required for denoting the number of a configuration.

Alternatively, the length of the GP slot may also be restricted to be 1, 2, 3 or 11 symbols based on Table 7 to obtain configurations shown in Table 14.

TABLE 14

| Length of the GP slot (symbol) | Length of the DwPTS + length of the GP slot + length of the UpPTS (symbol) |
| --- | --- |
| 1 | 11 + 1 + 2 |
| 2 | 10 + 2 + 2 |
| 3 | 9 + 3 + 2 |
| 13 | 1 + 13 + 0 |

When adopting the configurations shown in Table 14, there are 4 configurations in total and only 2 bits are required for denoting the number of a configuration.

Alternatively, the length of the GP slot may also be restricted to be 1, 3, 5 or 11 symbols based on Table 7 to obtain configurations shown in Table 15.

TABLE 15

| Length of the GP slot (symbol) | Length of the DwPTS + length of the GP slot + length of the UpPTS (symbol) |
| --- | --- |
| 1 | 11 + 1 + 2 |
| 3 | 9 + 3 + 2 |
| 5 | 7 + 5 + 2 |
| 11 | 1 + 11 + 2 |

When adopting the configurations shown in Table 15, there are 4 configurations in total and only 2 bits are required for denoting the number of a configuration.

When extended CP is adopted, according to Table 2, the length of the GP slot may be restricted to be 0, 1, 2, 3, 4, 5, 8 or 11 symbols to obtain configurations shown in Table 16.

TABLE 16

| Length of the GP slot (symbol) | Length of the DwPTS + length of the GP slot + length of the UpPTS (symbol) |
| --- | --- |
| 0 | 10 + 0 + 2 |
| 1 | 9 + 1 + 2 |
| 2 | 8 + 2 + 2 |
| 3 | 7 + 3 + 2 |
| 4 | 6 + 4 + 2 |
| 5 | 5 + 5 + 2 |
| 8 | 2 + 8 + 2 |
| 11 | 1 + 11 + 0 |

When adopting the configurations shown in Table 16, there are 8 configurations in total and only 3 bits are required for denoting the number of a configuration.

Alternatively, the length of the GP slot may also be restricted to be 1, 2, 3 or 11 symbols based on Table 8 to obtain configurations shown in Table 17.

TABLE 17

| Length of the GP slot (symbol) | Length of the DwPTS + length of the GP slot + length of the UpPTS (symbol) |
| --- | --- |
| 1 | 9 + 1 + 2 |
| 2 | 8 + 2 + 2 |
| 3 | 7 + 3 + 2 |
| 11 | 1 + 11 + 0 |

When adopting the configurations shown in Table 17, there are 4 configurations in total and only 2 bits are required for denoting the number of a configuration.

Alternatively, the length of the GP slot may also be restricted to be 1, 2, 3 or 8 symbols based on Table 8 to obtain configurations shown in Table 18.

TABLE 18

| Length of the GP slot (symbol) | Length of the DwPTS + length of the GP slot + length of the UpPTS (symbol) |
| --- | --- |
| 1 | 9 + 1 + 2 |
| 2 | 8 + 2 + 2 |
| 3 | 7 + 3 + 2 |
| 8 | 2 + 8 + 2 |

When adopting the configurations shown in Table 18, there are 4 configurations in total and only 2 bits are required for denoting the number of a configuration.

For Table 11 and Table 12 configured in step 1501b, the length of the GP slot may be further restricted. For example, when normal CP is adopted, according to Table 11, the length of the GP slot may be restricted to be 2 or 11 symbols to obtain the configurations shown in Table 19.

TABLE 19

| GP after puncture | 4:3 Dw:GP:Up 11:1:2 | | 6:1, 3:4 Dw:GP:Up 1:2:11 | | 5:2 Dw:GP:Up 6:2:6 | | 2:5 Dw:GP:Up 5:2:7 | |
|---|---|---|---|---|---|---|---|---|
| | DwPTS | UpPTS | DwPTS | UpPTS | DwPTS | UpPTS | DwPTS | UpPTS |
| 2 | 10 | 2 | 1 | 11 | 6 | 6 | 5 | 7 |
| 11 | 1 | 2 | 1 | 2 | 1 | 2 | 1 | 2 |

When adopting the configurations shown in Table 19, there are 5 configurations in total and only 3 bits are required for denoting the number of a configuration.

Alternatively, the length of the GP slot may also be restricted to be the minimum value based on Table 11 to obtain configurations shown in Table 20.

TABLE 20

| GP after puncture | 4:3 Dw:GP:Up 11:1:2 | | 6:1, 3:4 Dw:GP:Up 1:2:11 | | 5:2 Dw:GP:Up 6:2:6 | | 2:5 Dw:GP:Up 5:2:7 | |
|---|---|---|---|---|---|---|---|---|
| | DwPTS | UpPTS | DwPTS | UpPTS | DwPTS | UpPTS | DwPTS | UpPTS |
| 2 | 10 | 2 | 1 | 11 | 6 | 6 | 5 | 7 |

The configuration in Table 20 is actually the configuration in Table 9 when normal CP is adopted under the minimum coverage area. In this case, there are 4 configurations, in total and only 2 bits are required for denoting the number of a configuration.

When extended CP is adopted, according to Table 11, the length of the GP slot may be restricted to be 1, 2 or 8 symbols to obtain configurations shown in Table 21.

TABLE 21

| GP after puncture | 4:3 Dw:GP:Up 9:1:2 | | 6:1, 3:4 Dw:GP:Up 1:2:9 | | 5:2 Dw:GP:Up 5:2:5 | | 2:5 Dw:GP:Up 5:1:6 | |
|---|---|---|---|---|---|---|---|---|
| | DwPTS | UpPTS | DwPTS | UpPTS | DwPTS | UpPTS | DwPTS | UpPTS |
| 1 | 9 | 2 | | | | | 5 | 6 |
| 2 | | | 1 | 9 | 5 | 5 | | |
| 8 | 2 | 2 | | | 2 | 2 | 2 | 2 |

When adopting the configurations shown in Table 21, there are 5 configurations in total and only 3 bits are required for denoting the number of a configuration.

Alternatively, the length of the GP slot may also be restricted to be the minimum value based on Table 12 to obtain configurations shown in Table 22.

TABLE 22

| GP after puncture | 4:3 Dw:GP:Up 9:1:2 | | 6:1, 3:4 Dw:GP:Up 1:2:9 | | 5:2 Dw:GP:Up 5:2:5 | | 2:5 Dw:GP:Up 5:1:6 | |
|---|---|---|---|---|---|---|---|---|
| | DwPTS | UpPTS | DwPTS | UpPTS | DwPTS | UpPTS | DwPTS | UpPTS |
| 1 | 9 | 2 | | | | | 5 | 6 |
| 2 | 8 | 2 | 1 | 9 | 5 | 5 | | |

The configurations in Table 22 are actually the configurations in Table 10 when extended CP is adopted under the minimum coverage area. When these configurations are adopted, there are 4 configurations in total and only 2 bits are required for denoting the number of a configuration.

According to the above, the length of the GP slot may be restricted according to the system performance requirement to reduce the number of configurations to be chosen from and reduce the number of bits required for issuing information about the number. Although the restriction to the length of the GP slot will lead to the increase of the difference between coverage areas in adjacent levels, the difference is still smaller than that in the prior art.

In the above solution, the number of bits required for the number of the configuration is 3 or 2 bits. Counting the 1 bit required for issuing information about compatibility, it can be concluded that 4 or 3 bits are required for informing the user device of the selected configuration. Based on the above principle, step 1501 may be performed taking into account the requirements to the difference between coverage area levels and plan of system resources to configure the configurations.

The methods provided by the first, second and third embodiments of the present invention may be implemented in the system shown in FIG. 6.

The foregoing description is only a preferred embodiment of the present invention and is not for use in limiting the protection scope thereof. Any modification, equivalent replacement and improvement made under the spirit and principle of the present invention should be included in the protection scope thereof.

The invention claimed is:

1. A method for data transmission in a Time Division Duplexing (TDD) system, comprising:
   configuring, by a base station, a length respectively for a Downlink Pilot Slot (DwPTS) and an Uplink Pilot Slot (UpPTS) within a special field of a radio half-frame based on a current coverage area taking one Orthogonal Frequency Division Multiplexing (OFDM) symbol as a unit, and issuing a configured result to a user device; calculating a Guard Period (GP) length required for switching from downlink to uplink based on the coverage area, and configuring a length of a GP slot to occupy N OFDM symbols, wherein the GP length calculated is shorter than N OFDM symbols but longer than N−1 OFDM symbols, N is an integer greater than 1, wherein a total length of the DwPTS, the GP slot and the UpPTS is kept to be 1 ms;
   constructing, by the base station, radio half-frames for data transmission according to the configured result.

2. The method of claim 1, further comprising:
   establishing, according to different coverage areas of the base station and different compatibility requirements with a TD-SCDMA system, a relationship between each coverage area and compatibility requirement and lengths of the GP slot, the DwPTS and the UpPTS in advance and storing all relationships in the base station;
   wherein the configuring the length respectively for the DwPTS and the UpPTS comprises: determining, by the base station, a length respectively for the GP slot, the DwPTS and the UpPTS corresponding to a current coverage area and compatibility requirement according to the relationships stored.

3. The method of claim 2, further comprising:
   after establishing the relationships, assigning, in the base station, a number for each combination of lengths of the GP slot, the DwPTS and the UpPTS, and storing, by the user device, different combinations of lengths of the GP slot, the DwPTS and the UpPTS, and assigning a number for each combination in the user device;
   wherein the issuing the configured result to the user device comprises: issuing, by the base station, a number corresponding to the combination of lengths determined for the GP slot, the DwPTS and the UpPTS to the user device.

4. The method of claim 2, wherein the relationships established between the coverage area and compatibility requirement and the lengths of the GP slot, the DwPTS and the UpPTS comprises:
   if it is required to be compatible with the TD-SCDMA system, calculating, according to a structure of regular slots of the radio half-frame, the lengths of the GP slot, the DwPTS and the UpPTS corresponding to different downlink-to-uplink slot ratios of the TD-SCDMA system and different coverage areas of the base station; and
   if it is not required to be compatible with the TD-SCDMA system, calculating, according to the structure of regular slots of the radio half-frame, the lengths of the GP slot, the DwPTS and the UpPTS corresponding to different coverage areas of the base station.

5. The method of claim 4, wherein the calculating the lengths of the GP slot, the DwPTS and the UpPTS corresponding to different downlink-to-uplink slot ratios of the TD-SCDMA system and different coverage areas of the base station comprises:
   with respect to different Cyclic Prefix (CP) types, establishing a relationship between each downlink-to-uplink slot ratio of the TD-SCDMA system and the lengths of the GP slot, the DwPTS and the UpPTS under a minimum coverage area of the base station; and
   as to each coverage area requirement other than the minimum coverage area requirement, extending the length of the GP slot based on the relationship established under the minimum coverage area of the base station, and establishing a relationship between the coverage area requirement and the downlink-to-uplink slot ratio and the lengths of the GP slot, the DwPTS and the UpPTS.

6. The method of claim 2, further comprising:
   before storing the relationships, dividing the relationships into subsets according to downlink-to-uplink slot ratios of the TD-SCDMA system, assigning a number for each subset, and assigning a number for each combination of lengths of the GP slot, the DwPTS and the UpPTS in each subset;
   wherein the relationships are stored by the subsets, and the method further comprises: storing, in the user device, the number corresponding to each combination of lengths of the GP slot, the DwPTS and the UpPTS by the subsets.

7. The method of claim 6, wherein the issuing the configured result to the user device comprises: issuing a subset number and a configuration number of the lengths determined for the GP slot, the DwPTS and the UpPTS to the user device.

8. The method of claim 6, wherein the issuing the configured result to the user device comprises: issuing a configuration number of the lengths determined for the GP slot, the DwPTS and the UpPTS to the user device.

9. The method of claim 4, wherein the structure of the regular slots comprises: a radio half-frame comprising 8 regular slots each of which has a length of 0.5 ms and two regular slots form a subframe;
   if normal CP is adopted, the relationships between the downlink-to-uplink slot ratios and the lengths of the GP slot, the DwPTS and the UpPTS under the minimum coverage area of the base station comprise:

| Downlink-to-uplink ratios of the TD-SCDMA system | Length of the DwPTS | Length of the GP slot | Length of the UpPTS |
|---|---|---|---|
| 1:6 | 10 symbols | 2 symbols | 2 symbols |
| 4:3 | 10 symbols | 2 symbols | 2 symbols | if extended CP is adopted, the relationships established between the downlink-to-uplink slot ratios and the lengths of the GP slot, the DwPTS and the UpPTS under the minimum coverage area of the base station comprise:

| Downlink-to-uplink ratios of the TD-SCDMA system | Length of the DwPTS | Length of the GP slot | Length of the UpPTS |
|---|---|---|---|
| 1:6 | 8 symbols | 2 symbols | 2 symbols |
| 4:3 | 9 symbols | 1 symbol | 2 symbols |

10. The method of claim 4, wherein the structure of the regular slots comprises: a radio half-frame comprising 8 regular slots each of which has a length of 0.5 ms and two regular slots form a subframe;
if normal CP is adopted, the relationships between different coverage area and compatibility requirements and the lengths of the GP slot, the DwPTS and the UpPTS comprise:

| Coverage area | Compatibility requirement | Length of the DwPTS | Length of the GP slot | Length of the UpPTS |
|---|---|---|---|---|
| ≦10.7 km | Not compatible | 11 symbols | 1 symbol | 2 symbols |
| ≦21.4 km | Compatible with downlink-to-uplink slot ratio 4:3 and 1:6 or not compatible | 10 symbols | 2 symbols | 2 symbols |
| ≦32.1 km | Compatible with downlink-to-uplink slot ratio 4:3 and 1:6 or not compatible | 9 symbols | 3 symbols | 2 symbols | if extended CP is adopted, the relationships between different coverage area and compatibility requirements and the lengths of the GP slot, the DwPTS and the UpPTS comprise:

| Coverage area | Compatibility requirement | Length of the DwPTS | Length of the GP slot | Length of the UpPTS |
|---|---|---|---|---|
| ≦12.4 km | Compatible with downlink-to-uplink slot ratio 4:3 or not compatible | 9 symbols | 1 symbol | 2 symbols |
| ≦24.8 km | Compatible with downlink-to-uplink slot ratio 4:3 and 1:6 or not compatible | 8 symbols | 2 symbols | 2 symbols |

11. The method of claim 1, further comprising:
respectively configuring a set of configurations for the special field with respect to a situation where it is required to be compatible with a TD-SCDMA system and a situation where it is not required to be compatible with the TD-SCDMA system, wherein each configuration comprises: a length of a GP slot, a length of the DwPTS and a length of the UpPTS which are configured taking each symbol as a unit;
wherein the configuring the lengths for the DwPTS and the UpPTS within the special field of the radio half-frame based on the current coverage area comprises:
determining, by the base station, a set of configurations according to a current situation that whether it is required to be compatible with the TD-SCDMA system; and selecting a configuration from the set of configurations determined according to a current coverage area and system performance requirement.

12. The method of claim 11, wherein the structure of the regular slots in the radio half-frame is: the radio half-frame comprising 8 regular slots each of which has a length of 0.5 ms and two regular slots form a subframe;
if normal CP is adopted, with respect to the situation where it is not required to be compatible with the TD-SCDMA system, the set of configurations comprises:

| Length of the DwPTS | Length of the GP slot | Length of the UpPTS |
|---|---|---|
| 11 | 1 | 2 |
| 10 | 2 | 2 |
| 9 | 3 | 2 |
| 3 | 9 | 2 | if extended CP is adopted, with respect to the situation where it is not required to be compatible with the TD-SCDMA system, the set of configurations comprises:

| Length of the DwPTS | Length of the GP slot | Length of the UpPTS |
|---|---|---|
| 9 | 1 | 2 |
| 8 | 2 | 2 |
| 3 | 7 | 2 | wherein the lengths of the DwPTS, the GP slot and the UpPTS take one symbol as a unit.

13. The method of claim 11, wherein each set of configurations is configured further based on a restriction to the length of the GP slot.

14. The method of claim 11, wherein the configuring the set of configurations for the situation where it is required to be compatible with the TD-SCDMA system comprises: configuring the set of configurations according to different downlink-to-uplink slot ratios of the TD-SCDMA system and different coverage area requirements.

15. The method of 14, wherein it is required to be compatible with TD-SCDMA system whose GP slot has a length of 75 us, the set of configurations under a minimum coverage area requirement comprises:
if normal CP is adopted:

| Downlink-to-uplink ratios of the TD-SCDMA system | Length of the DwPTS | Length of the GP slot | Length of the UpPTS |
|---|---|---|---|
| 4:3 | 10 | 2 | 2 | if extended CP is adopted:

| Downlink-to-uplink ratios of the TD-SCDMA system | Length of DwPTS | Length of GP slot | Length of UpPTS |
|---|---|---|---|
| 4:3 | 9 | 1 | 2 | wherein the lengths of the DwPTS, the GP slot and the UpPTS take the symbol as a unit.

16. The method of claim 14, wherein each set of configurations is further configured based on a restriction to the length of the GP slot.

17. The method of claim 11, further comprising: after establishing the sets of configurations, respectively assigning numbers for the configurations in each set which is configured with respect to the situation where it is required to be compatible with the TD-SCDMA system or the situation where it is not required to be compatible with the TD-SCDMA system, and storing relationships between the configurations and numbers in the base station and the user device;
   wherein the base station issuing the configuration selected to the user device comprises: informing, by the base station, the user device of whether it is required to be compatible with the TD-SCDMA system, and issuing a number corresponding to the configuration selected to the user device;
   wherein the user device constructing the radio half-frame according to the configuration selected comprises: determining, by the user device, the set of configurations according to the information about whether it is required to be compatible with the TD-SCDMA system, determining among the set of configurations the configuration selected by the base station according to the number received, and constructing the radio half-frames according to the configuration.

18. An apparatus for data transmission in a Time Division Duplexing (TDD) system, comprising:
   means for respectively setting, within a special field of a radio half-frame and according to a coverage area, a length for a Downlink Pilot Slot (DwPTS) and an Uplink Pilot Slot (UpPTS) taking one Orthogonal Frequency Division Multiplexing (OFDM) symbol as a unit, calculating a Guard Period (GP) length required for switching from downlink to uplink based on the coverage area, and configuring a length of a GP slot to occupy N OFDM symbols, wherein the GP length calculated is shorter than N OFDM symbols but longer than N−1 OFDM symbols, N is an integer greater than 1, issuing a configured result to a user device; and constructing radio half-frames for data transmission according to the configured result, wherein a total length of the DwPTS, the GP slot and the UpPTS is kept to be 1 ms.

19. The apparatus of claim 18, further comprising:
   a relationship storing unit, adapted to establish a relationship between each coverage area and compatibility requirement with a TD-SCDMA system and lengths of the GP slot, the DwPTS and the UpPTS, and store all relationships;
   a selecting unit, adapted to select a combination of lengths of the GP slot, the DwPTS and the UpPTS from the relationships stored in the relationship storing unit according to a current coverage area and compatibility requirement.

20. An apparatus for data transmission in a Time Division Duplexing (TDD) system, comprising:
   means for configuring a set of configurations for a special field with respect to a situation where it is required to be compatible with a TD-SCDMA system and configure a set of configurations for the special field with respect to a situation where it is not required to be compatible with the TD-SCDMA system, wherein each configuration comprises lengths of a Guard Period (GP) slot, a Downlink Pilot Slot (DwPTS) and an Uplink Pilot Slot (UpPTS) which are configured taking one Orthogonal Frequency Division Multiplexing (OFDM) symbol as a unit, and a total length of the DwPTS, the GP slot and the UpPTS is kept to be 1 ms;
   means for determining one set of configurations according to a current situation that whether it is required to be compatible with the TD-SCDMA system; and
   means for selecting a configuration from the set of configurations determined according to a coverage area and system performance, issue the configuration selected to a user device; and construct radio half-frames for performing data transmission according to the selected configuration.

* * * * *